(12) United States Patent
Morimoto et al.

(10) Patent No.: US 12,627,183 B2
(45) Date of Patent: May 12, 2026

(54) ROTOR UNIT AND ROTOR MAIN BODY FOR ELECTRIC MOTOR

(71) Applicant: KANZAKI KOKYUKOKI MFG. CO., LTD., Amagasaki (JP)

(72) Inventors: Takahiro Morimoto, Osaka (JP); Yuto Kimura, Osaka (JP); Toshinobu Shinohara, Amagasaki (JP); Hitoshi Adachi, Amagasaki (JP); Kohei Okura, Amagasaki (JP); Tatsuya Kamada, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 125 days.

(21) Appl. No.: 18/240,630

(22) Filed: Aug. 31, 2023

(65) Prior Publication Data

US 2024/0079918 A1 Mar. 7, 2024

(30) Foreign Application Priority Data

Sep. 1, 2022 (JP) ................................. 2022-139071

(51) Int. Cl.
*H02K 1/27* (2022.01)
*H02K 1/276* (2022.01)
*H02K 1/28* (2006.01)

(52) U.S. Cl.
CPC .............. *H02K 1/276* (2013.01); *H02K 1/28* (2013.01)

(58) Field of Classification Search
CPC ................................. H02K 1/276; H02K 1/28
See application file for complete search history.

(56) References Cited

U.S. PATENT DOCUMENTS

2013/0181564 A1* 7/2013 Uchitani ................ H02K 1/274
310/156.08

FOREIGN PATENT DOCUMENTS

JP 2012231602 A 11/2012
JP 2021027713 A 2/2021

* cited by examiner

*Primary Examiner* — Thomas Truong
(74) *Attorney, Agent, or Firm* — CANTOR COLBURN LLP

(57) ABSTRACT

[Problem] To provide a rotor unit that may effectively prevent detachment of a magnet with a holder while absorbing dimensional errors of a rotor main body and the magnet. [Solution] In the rotor unit according to the present invention, the holder mountable on the rotor main body prevents the magnet from being detached from the rotor main body. The holder includes an elastically deformable insertion arm extending from a flat-plate like holder main body, a hook portion provided on a free end side of the insertion arm, an elastically deformable magnet pressing arm extending from the holder main body, and a magnet pressing portion provided on a free end side of the magnet pressing arm. The rotor main body includes a hook hole into which the insertion arm is inserted, and the hook hole is provided with a locking portion in which the hook portion is lockable. When the hook portion is locked in the locking portion, the magnet pressing portion presses an end face of the magnet due to inherent elasticity of the magnet pressing arm accompanying elastic deformation.

15 Claims, 26 Drawing Sheets

ROTOR UNIT AND ROTOR MAIN BODY FOR ELECTRIC MOTOR

CROSS REFERENCE TO RELATED APPLICATIONS

The present invention claims priority under 35 U.S.C. § 119 to Japanese Application No. 2022-139071 filed Sep. 1, 2022, the entire content of which is incorporated herein by reference.

TECHNICAL FIELD

The present invention relates to a rotor unit in which a magnet is attached to a rotor main body in an electric motor and to the rotor main body.

BACKGROUND ART

There are proposals such that, in a rotor unit including a rotor main body and a magnet attached to the rotor main body, a holder attachable to an axial end face of the rotor main body is provided, and the holder prevents the magnet from being detached from the rotor main body in an axial direction (see Patent Documents 1 and 2 below).

Specifically, the above-described Patent Document 1 discloses a rotor unit that includes a rotor main body including a cylindrical portion and a plurality of salient poles that protrudes outward in the radial direction from the cylindrical portion and is arranged with gaps in a circumferential direction, a magnet provided in a magnet installation space formed between the adjacent salient poles in the circumferential direction, and a holder attached to an axial end face of the rotor main body.

The rotor main body and the magnet are formed such that an axial end face of the magnet is located outward in the axial direction of an axial end face of the rotor main body, and a recessed holder installation space that opens outward in the axial direction is formed by an inner peripheral surface of the magnet and an axial end face of the cylindrical portion.

The holder includes a holder main body inserted into the holder installation space, an arm portion extending outward in the radial direction from the holder main body, and a contact portion protruding inward in the axial direction from a free end portion of the arm portion.

In the rotor unit disclosed in Patent Document 1, it is considered that, in a state where the holder main body is inserted into the holder installation space so as to be in contact with the axial end face of the cylindrical portion, the contact portion provided at the free end portion of the cantilevered arm portion is in contact with the axial end face of the magnet, and axial dimensional errors of the holder main body and the magnet may be absorbed by the axial elastic deformation amount of the arm portion.

However, in the rotor unit disclosed in Patent Document 1, as the holder main body is inserted into the holder installation space in a state where the axial inner end face is in surface contact with the axial end face of the rotor main body and the outer peripheral surface is in surface contact with the inner peripheral surface of the magnet, axial dimensional errors of the holder main body and the magnet need to be absorbed only by the axial elastic deformation amount of the arm portion, and the dimensional errors may not be sufficiently absorbed.

Further, in order to fix the holder main body to the rotor main body by fitting the holder main body into the holder installation space, it is necessary to reduce manufacturing errors of the holder main body, the rotor main body, and the magnet as much as possible, and furthermore, in a case where the holder is bonded to the axial end face of the rotor main body, a separate bonding operation is required, which leads to a disadvantage such as an increase in manufacturing costs. Further, in the configuration where the holder is attached to the rotor main body, there is a disadvantage such that it is difficult to perform a smooth sorting operation at the time of recycling, and there is a possibility that, when an adhesive is uncured, the magnet gets broken by the rotor main body due to vibration or the like, and the broken pieces are clogged in a gap between a stator and the rotor main body to affect motor driving of a mechanical lock, or the like.

The above-described Patent Document 2 discloses a rotor unit that includes a cylindrical rotor main body in which a plurality of magnet holes opening to an axial end face is formed, magnets inserted into the magnet holes, and a holder attached to an axial end face of the rotor main body.

The magnet is inserted into the magnet hole such that the axial end face is flush with the axial end face of the rotor main body.

The rotor main body is formed with an arm insertion hole that opens to an axial end face at a position different from the magnet hole, and the holder includes a flat-plate like pressing portion that is in contact with the axial end faces of the rotor main body and the magnet, an arm portion that protrudes from the pressing portion in a direction substantially perpendicular to the plane of the pressing portion so as to be inserted into the arm insertion hole, and a hook portion provided at a free end of the arm portion.

The arm insertion hole is provided with a recessed portion with which the hook portion may engage, and the hook portion engages with the recessed portion in a state where the pressing portion is in contact with the axial end faces of the rotor main body and the magnet so that the holder is fixed to the rotor main body and the holder prevents the magnet from being detached from the rotor main body.

In the rotor unit disclosed in the above Patent Document 2, the arm portion is elastically deformed in the radial direction of the rotor main body. Therefore, a certain degree of manufacturing error in the radial direction of the rotor main body and the magnet may be absorbed by the arm portion.

However, as the hook portion provided at the free end of the arm portion is configured to engage with the recessed portion in a state where the flat-plate like pressing portion is in contact with the axial end faces of the rotor main body and the magnet, it is difficult to absorb manufacturing errors of the hook portion, the rotor main body, and the magnet in the axial direction.

PRIOR ART DOCUMENT

Patent Document

Patent Document 1: Japanese Unexamined Patent Publication No. 2021-027713

Patent Document 2: Japanese Unexamined Patent Publication No. 2012-231602

SUMMARY OF INVENTION

Technical Problem

The present invention has been made in consideration of the above-described conventional technologies and has an object to provide a rotor unit that is configured to prevent detachment of a magnet from a rotor main body with a holder attached to the rotor main body and that may effectively prevent detachment of the magnet with the holder by effectively absorbing dimensional errors of a hook portion, the rotor main body, and the magnet while facilitating attachment and detachment of the holder to and from the rotor main body.

Solution to Problem

In order to achieve the above object, the present invention provides a rotor unit including a rotor main body having a plurality of magnetic flat plates laminated therein, a magnet attached to the rotor main body, and a first end-face side holder attached to a first end face of the rotor main body on one side in a rotation axis direction, the rotor main body includes a shaft hole that is open to at least the first end face on a rotation axis and has a rotation shaft inserted thereinto, a magnet attachment hole that is open to at least the first end face at a position away from the shaft hole outward in a radial direction and has the magnet attached thereto, and a hook hole that is open to at least the first end face at a position different from the shaft hole and the magnet attachment hole in the radial direction, the first end-face side holder includes a flat-plate like holder main body including a central opening, an elastically deformable insertion arm extending from the holder main body so as to be inserted into the hook hole in an installation posture of the holder main body in which, in a planar view, the central opening is overlapped with the shaft hole and the holder main body is opposed to the first end face of the rotor main body, a hook portion provided on a free end side of the insertion arm, a magnet pressing arm that extends from the holder main body and is elastically deformable in a direction perpendicular to a plate surface of the holder main body, and a magnet pressing portion provided on a free end side of the magnet pressing arm so as to be in contact with a first end face of the magnet on the one side in the rotation axis direction attached to the magnet attachment hole in the installation posture of the holder main body, the hook hole is provided with a first end-face side locking portion in which the hook portion is lockable, and when the hook portion is locked in the first end-face side locking portion, the magnet pressing portion is pressed against the first end face of the magnet due to inherent elasticity of the magnet pressing arm accompanying elastic deformation.

Preferably, the first end-face side holder further includes a holder pressing arm that extends from the holder main body and is elastically deformable in a direction perpendicular to the plate surface of the holder main body, and a holder pressing portion provided on a free end side of the holder pressing arm so as to be in contact with the first end face of the rotor main body in the installation posture of the holder main body, and when the hook portion of the first end-face side holder is locked in the first end-face side locking portion, the holder pressing portion is pressed against the first end face of the rotor main body due to inherent elasticity of the holder pressing arm accompanying elastic deformation.

Preferably, the magnet pressing arm extends from the holder main body so as to be positioned on one of an outer side and an inner side in the radial direction with respect to the rotation axis as the magnet pressing arm extends from a base end side to a free end side, and the holder pressing arm extends from the holder main body so as to be positioned on other one of the outer side and the inner side in the radial direction with respect to the rotation axis as the holder pressing arm extends from a base end side to a free end side.

For example, the holder main body includes an inner ring body defining the central opening, an outer ring body surrounding the inner ring body, and a plurality of bridges coupling the inner ring body and the outer ring body.

The bridges are arranged with gaps in a circumferential direction around the rotation axis, and the magnet pressing arm and the holder pressing arm are arranged in the gaps alternately in the circumferential direction. The magnet pressing arm extends in the radial direction from one of the inner ring body and the outer ring body, and the holder pressing arm extends in the radial direction from other one of the inner ring body and the outer ring body.

Alternatively, the holder main body includes a ring body defining the central opening, a first arm extending from the ring body in the radial direction, and a support frame extending from the ring body in the radial direction.

The first arm and the support frame are arranged alternately in the circumferential direction around the rotation axis. The support frame includes a pair of radially extending arms extending to one side in the radial direction while being separated from each other in the circumferential direction with a gap therebetween, a coupling arm coupling free end sides of the pair of radially extending arms, and a second arm extending from the coupling arm to other side in the radial direction in the gap. One of the first arm and the second arm forms the magnet pressing arm, and other one of the first arm and the second arm forms the holder pressing arm.

The rotor unit according to the present invention may include a second end-face side holder attached to a second end face of the rotor main body on other side in the rotation axis direction, and the second end-face side holder has a configuration identical to the first end-face side holder.

In this case, the magnet attachment hole and the hook hole are through-holes that are also open to the second end face, and the hook hole is provided with a second end-face side locking portion in which a hook portion of the second end-face side holder is lockable.

When the hook portion of the second end-face side holder is locked in the second end-face side locking portion, the magnet pressing portion is pressed against a second end face of the magnet due to inherent elasticity of the magnet pressing arm accompanying elastic deformation, and the holder pressing portion is pressed against the second end face of the rotor main body due to inherent elasticity of the holder pressing arm accompanying elastic deformation.

According to a first aspect, the rotor main body is provided with a plurality of the hook holes arranged in a circumferential direction around the rotation axis, and the magnetic flat plate forming the rotor main body includes a shaft-hole opening forming the shaft hole, a magnet opening forming the magnet attachment hole, and a plurality of hook openings arranged along the circumferential direction around the rotation axis to form the plurality of the hook holes.

The plurality of hook openings includes a first opening having a radial distance $A1$ between a circumferentially extending edge on an inner side in the radial direction and the rotation axis and a radial distance $A2$ between a circumferentially extending edge on an outer side in the radial direction and the rotation axis, and a second opening having a radial distance $B1$ between a circumferentially extending edge on the inner side in the radial direction and the rotation axis and a radial distance $B2$ between a circumferentially extending edge on the outer side in the radial direction and the rotation axis (where A1<B1<A2<B2). The first opening and the second opening are arranged symmetrically to each other in the circumferential direction with respect to a virtual center plane that passes through the rotation axis and is perpendicular to a plane of the magnetic flat plate.

The plurality of magnetic flat plates forms first to third magnetic assemblies formed by laminating and fixing the magnetic flat plates in a state where the magnetic flat plates face in an identical direction with regard to a plate thickness direction and openings of an identical type are aligned with each other, and the first magnetic assembly and the third magnetic assembly include an identical number of the magnetic flat plates so as to have an identical axial thickness.

The rotor main body includes the first to third magnetic assemblies that are laminated and fixed in this order from the one side to the other side in the rotation axis direction.

The first to third magnetic assemblies are laminated and fixed in a state where, with regard to the plate thickness direction, first surfaces on one side in the plate thickness direction of the magnetic flat plates forming the first magnetic assembly and the third magnetic assembly face to the one side in the rotation axis direction, second surfaces on other side in the plate thickness direction of the magnetic flat plates forming the second magnetic assembly face to the one side in the rotation axis direction and, with regard to the circumferential direction around the rotation axis, virtual center planes of the first to third magnetic assemblies are aligned with each other.

According to the first aspect, a radial step between the hook opening of the first magnetic assembly and the hook opening of the second magnetic assembly forms the first end-face side locking portion, and a radial step between the hook opening of the third magnetic assembly and the hook opening of the second magnetic assembly forms the second end-face side locking portion.

Preferably, the first opening and the second opening are alternately arranged in the circumferential direction.

Preferably, the shaft hole is provided with a rotor main-body side engagement portion that engages with a rotation-shaft side engagement portion integrally or separately provided in the rotation shaft in a recessed-protruding manner in order to couple the rotation shaft and the rotor main body so as to disable a relative rotation around the rotation axis.

In this case, the shaft-hole opening of the magnetic flat plate is provided with an engagement-portion forming structure that forms the rotor main-body side engagement portion. The engagement-portion forming structure has a symmetrical shape with respect to the virtual center plane.

According to a second aspect, the rotor main body is provided with a plurality of the hook holes arranged in the circumferential direction around the rotation axis, and the magnetic flat plate forming the rotor main body includes a shaft-hole opening forming the shaft hole, a magnet opening forming the magnet attachment hole, and a plurality of hook openings arranged along the circumstantial direction around the rotation axis to form the plurality of the hook holes.

The plurality of hook openings includes a first opening having a circumferential length L1, and a second opening having a circumferential length L2 (where L2>L1). The first opening and the second opening are arranged symmetrically to each other in the radial direction with respect to a virtual center plane that passes through the rotation axis and is perpendicular to a plane of the magnetic flat plate.

The plurality of magnetic flat plates forms first to third magnetic assemblies formed by laminating and fixing the magnetic flat plates in a state where the magnetic flat plates face in an identical direction with regard to a plate thickness direction and openings of an identical type are aligned with each other, and the first magnetic assembly and the third magnetic assembly include an identical number of the magnetic flat plates so as to have an identical axial thickness.

The rotor main body includes the first to third magnetic assemblies that are laminated and fixed in this order from the one side to the other side in the rotation axis direction.

The first to third magnetic assemblies are laminated and fixed in a state where, with regard to the plate thickness direction, first surfaces on the one side in the plate thickness direction of the magnetic flat plates forming the first magnetic assembly and the third magnetic assembly face to the one side in the rotation axis direction, second surfaces on the other side in the plate thickness direction of the magnetic flat plates forming the second magnetic assembly face to the one side in the rotation axis direction and, with regard to the circumferential direction around the rotation axis, the virtual center planes of the first to third magnetic assemblies are aligned with each other.

According to the second aspect, a circumferential step between the hook opening of the first magnetic assembly and the hook opening of the second magnetic assembly forms the first end-face side locking portion, and a circumferential step between the hook opening of the third magnetic assembly and the hook opening of the second magnetic assembly forms the second end-face side locking portion.

In a first configuration according to the second aspect, the first opening and the second opening are formed such that the circumferential step between the hook opening of the first magnetic assembly and the hook opening of the second magnetic assembly includes a first step and a second step that extend to one side and other side in the circumferential direction, respectively, and the circumferential step between the hook opening of the third magnetic assembly and the hook opening of the second magnetic assembly includes a first step and a second step that extend to the one side and the other side in the circumferential direction, respectively.

In this case, the insertion arms of the first end-face side holder and the second end-face side holder include a first extension piece and a second extension piece that extend from the holder main body so as to be inserted along edges of the first opening on the one side and the other side in the circumferential direction, the hook portion includes a first hook portion and a second hook portion that protrude outward in the circumferential direction on free end sides of the first extension piece and the second extension piece, respectively, and the first hook portion and the second hook portion are lockable in the first step and the second step, respectively.

According to the second aspect, preferably, the shaft hole is provided with a rotor main-body side engagement portion that engages with a rotation-shaft side engagement portion integrally or separately provided in the rotation shaft in a recessed-protruding manner in order to couple the rotation shaft and the rotor main body so as to disable a relative rotation around the rotation axis.

In this case, the shaft-hole opening of the magnetic flat plate is provided with an engagement-portion forming structure that forms the rotor main-body side engagement portion. The engagement-portion forming structure has a symmetrical shape with respect to the virtual center plane.

Furthermore, the present invention provides a rotor main body including a shaft hole that has a rotation shaft inserted thereinto, a magnet attachment hole provided at a position away from the shaft hole outward in a radial direction, a plurality of hook holes provided along a circumferential direction at positions different from the shaft hole and the magnet attachment hole in the radial direction, and a plurality of magnetic flat plates, the magnetic flat plate includes a shaft-hole opening forming the shaft hole, a magnet opening forming the magnet attachment hole, and a plurality of hook openings arranged along the circumferential direction around the rotation axis to form the plurality of hook holes, the plurality of hook openings includes a first opening having a radial distance A1 between a circumferentially extending edge on an inner side in the radial direction and the rotation axis and a radial distance A2 between a circumferentially extending edge on an outer side in the radial direction and the rotation axis, and a second opening having a radial distance B1 between a circumferentially extending edge on the inner side in the radial direction and the rotation axis and a radial distance B2 between a circumferentially extending edge on the outer side in the radial direction and the rotation axis (where A1<B1<A2<B2), the first opening and the second opening are arranged symmetrically to each other in the circumferential direction with respect to a virtual center plane that passes through the rotation axis and is perpendicular to a plane of the magnetic flat plate, the plurality of magnetic flat plates forms a first magnetic assembly and a second magnetic assembly formed by laminating and fixing the magnetic flat plates in a state where the magnetic flat plates face in an identical direction with regard to a plate thickness direction and openings of an identical type are aligned with each other, the first magnetic assembly and the second magnetic assembly are laminated and fixed in this order from one side to other side in the rotation axis direction in a state where, with regard to the plate thickness direction, first surfaces on one side in the plate thickness direction of the magnetic flat plates forming the first magnetic assembly face to the one side in the rotation axis direction, second surfaces on other side in the plate thickness direction of the magnetic flat plates forming the second magnetic assembly face to the one side in the rotation axis direction and, with regard to the circumferential direction around the rotation axis, the virtual center planes of the first magnetic assembly and the second magnetic assembly are aligned with each other, and a radial step is provided between the hook opening of the first magnetic assembly and the hook opening of the second magnetic assembly.

Preferably, the rotor main body according to the present invention may further include a third magnetic assembly formed by laminating and fixing a plurality of magnetic flat plates having an identical configuration to that of the magnetic flat plates in a state where the plurality of magnetic flat plates faces in an identical direction with regard to the plate thickness direction and openings of an identical type are aligned with each other.

The third magnetic assembly is fixed to other side of the second magnetic assembly in the rotation axis direction in a state where first surfaces of the magnetic flat plates forming the third magnetic assembly face to the one side in the rotation axis direction and the virtual center planes are aligned with each other, and a radial step is provided between a hook opening of the third magnetic assembly and the hook opening of the second magnetic assembly.

Further, the present invention provides a rotor main body including a shaft hole that has a rotation shaft inserted thereinto, a magnet attachment hole provided at a position away from the shaft hole outward in a radial direction, a plurality of hook holes provided along a circumferential direction at positions different from the shaft hole and the magnet attachment hole in the radial direction, and a plurality of magnetic flat plates, the magnetic flat plate includes a shaft-hole opening forming the shaft hole, a magnet opening forming the magnet attachment hole, and a plurality of hook openings arranged along the circumferential direction around the rotation axis to form the plurality of hook holes, the plurality of hook openings includes a first opening having a circumferential length L1, and a second opening having a circumferential length L2 (where L2>L1), the first opening and the second opening are arranged symmetrically to each other in the radial direction with respect to a virtual center plane that passes through the rotation axis and is perpendicular to a plane of the magnetic flat plate, the plurality of magnetic flat plates forms a first magnetic assembly and a second magnetic assembly formed by laminating and fixing the magnetic flat plates in a state where the magnetic flat plates face in an identical direction with regard to a plate thickness direction and openings of an identical type are aligned with each other, the first magnetic assembly and the second magnetic assembly are laminated and fixed in this order from one side to other side in the rotation axis direction in a state where, with regard to the plate thickness direction, first surfaces on one side in the plate thickness direction of the magnetic flat plates forming the first magnetic assembly face to the one side in the rotation axis direction, second surfaces on other side in the plate thickness direction of the magnetic flat plates forming the second magnetic assembly face to the one side in the rotation axis direction and, with regard to the circumferential direction around the rotation axis, the virtual center planes of the first magnetic assembly and the second magnetic assembly are aligned with each other, and a circumferential step is provided between the hook opening of the first magnetic assembly and the hook opening of the second magnetic assembly.

The rotor main body may include a third magnetic assembly formed by laminating and fixing a plurality of magnetic flat plates having an identical configuration to that of the magnetic flat plates in a state where the plurality of magnetic flat plates faces in an identical direction with regard to the plate thickness direction and openings of an identical type are aligned with each other.

The third magnetic assembly is fixed to other side of the second magnetic assembly in the rotation axis direction in a state where first surfaces of the magnetic flat plates forming the third magnetic assembly face to the one side in the rotation axis direction and the virtual center planes are aligned with each other, and a circumferential step is provided between a hook opening of the third magnetic assembly and the hook opening of the second magnetic assembly.

Advantageous Effects of Invention

With the rotor unit according to the present invention, it is possible to facilitate attachment and detachment of the first end-face side holder to and from the rotor main body while effectively preventing detachment of the magnet with the holder by effectively absorbing dimensional errors of the hook portion, the rotor main body, and the magnet attached to the rotor main body.

Further, with the rotor unit according to the present invention, the magnetic flat plates forming the rotor main body are common with the identical shape, and the hook-portion locking portion may be formed inside the hook hole, and therefore it is sufficient to prepare only one mold used for manufacturing the magnetic flat plates, and the cost of the magnetic flat plates may be reduced.

BRIEF DESCRIPTION OF DRAWINGS

FIG. 2 is a perspective view of the rotor unit according to the first embodiment.

FIG. 12A and FIG. 12B are cross-sectional views taken along the line XII-XII in FIG. 2, illustrating the state in the middle of attaching the first end-face side holder and the second end-face side holder and the state after attaching the first end-face side holder and the second end-face side holder, respectively.

FIG. 15A and FIG. 15B are end-face diagrams of a first surface on one side in a plate thickness direction of a magnetic flat plate and a second surface on the other side in the plate thickness direction, respectively, in the rotor unit according to the first embodiment.

FIG. 18 is a plan view of the rotor unit according to a second embodiment of the present invention, illustrating the state where the first end-face side holder and the second end-face side holder are removed.

FIG. 21A and FIG. 21B are plan views of an end face (the first surface) on one side in the plate thickness direction and an end face (second surface) on the other side in the plate thickness direction of the magnetic flat plate in the rotor unit according to the second embodiment, respectively.

FIG. 26 is a vertical cross-sectional view of the rotor unit according to the third embodiment.

DESCRIPTION OF EMBODIMENTS

First Embodiment

Figure 1:
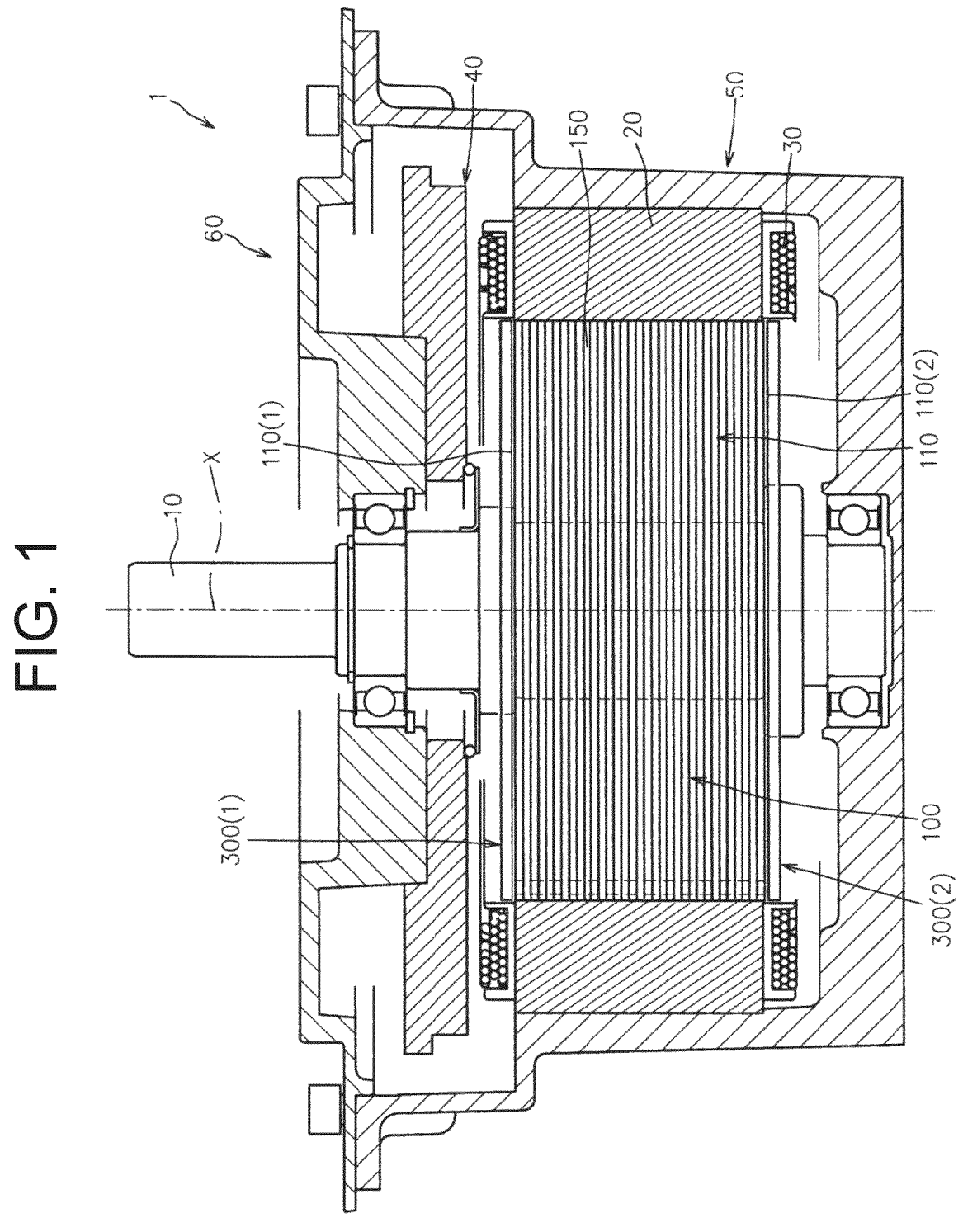
FIG. 1 is a vertical cross-sectional view of an electric motor to which a rotor unit according to a first embodiment of the present invention is applied.
Figure 2:
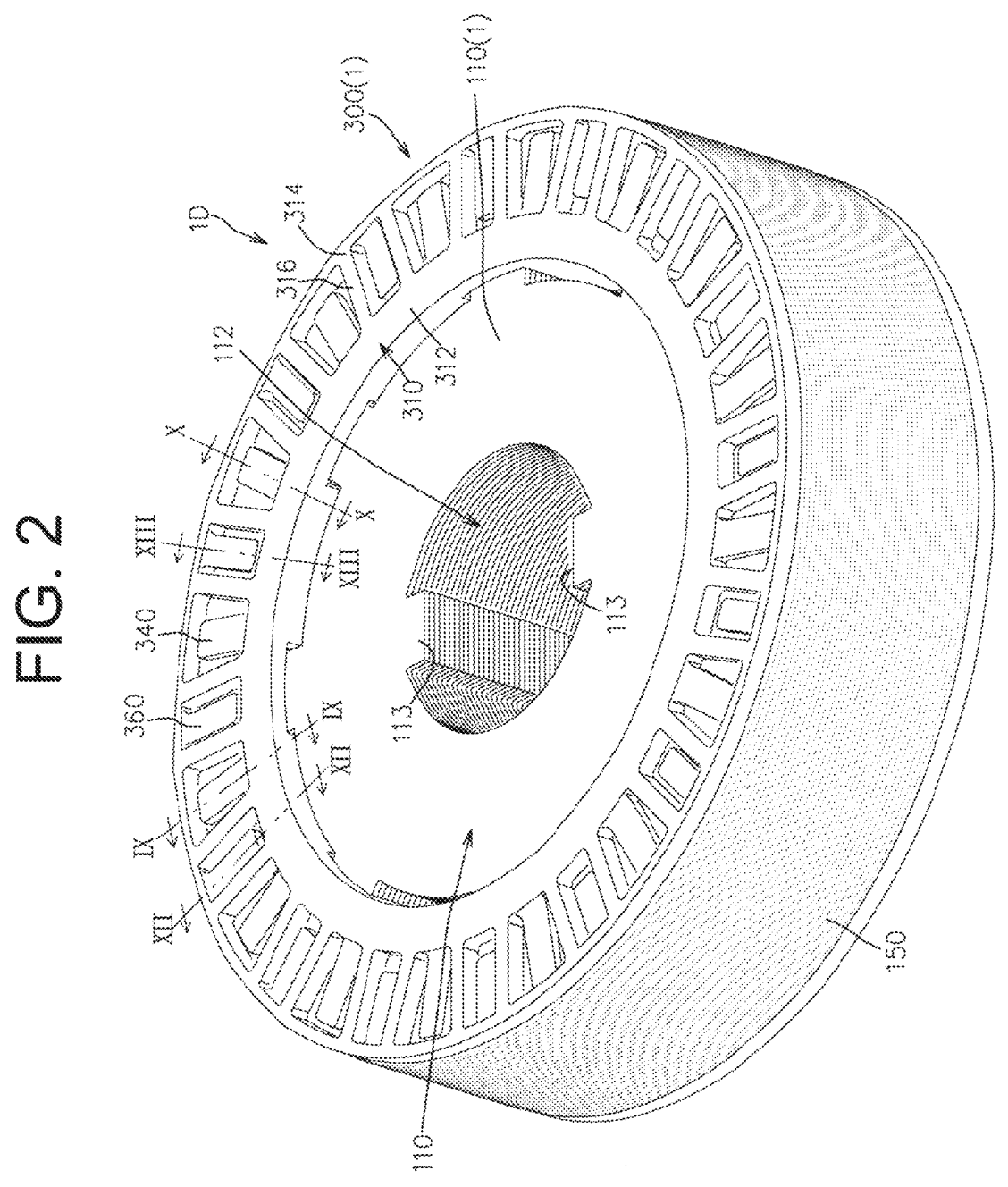

An embodiment of a rotor unit according to the present invention will be described below with reference to the accompanying drawings. FIG. 1 is a vertical cross-sectional view of an electric motor 1 to which a rotor unit 100 according to the present embodiment is applied. Furthermore, FIG. 2 is a perspective view of the rotor unit 100.

Further, in this description, a rotation axis X refers to the rotation axis of the rotor unit 100, the axial direction refers to a direction along the rotation axis X of the rotor unit 100, and the radial direction and the circumferential direction refer to the radial direction and the circumferential direction with reference to the rotation axis X of the rotor unit 100, respectively, unless otherwise specified.

As illustrated in FIG. 1, the electric motor 1 includes the rotor unit 100, a rotor rotation shaft 10 coupled to the rotor unit 100 so as to disable a relative rotation around the rotation axis X, a stator 20 provided on the outer side of the rotor unit 100 in the radial direction, a coil 30 attached to the stator 20, a bus-bar 40 that transmits electric power from the r outside to the coil 30, and a motor case 50 and a motor cover 60 forming a housing space to house the above-described components.

Figure 3:
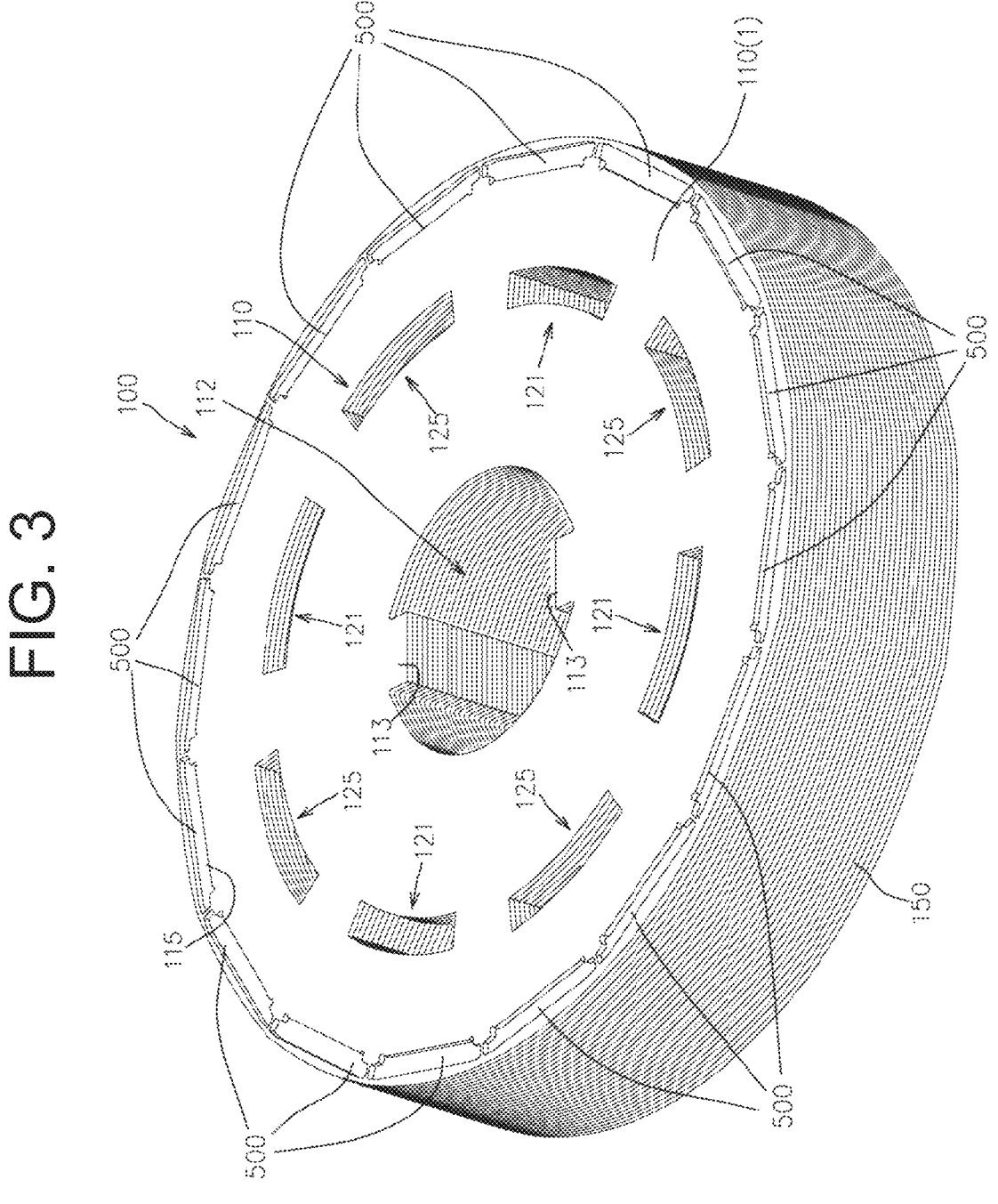
FIG. 3 is a perspective view of the rotor unit from which a first end-face side holder and a second end-face side holder are removed.
Figure 4:
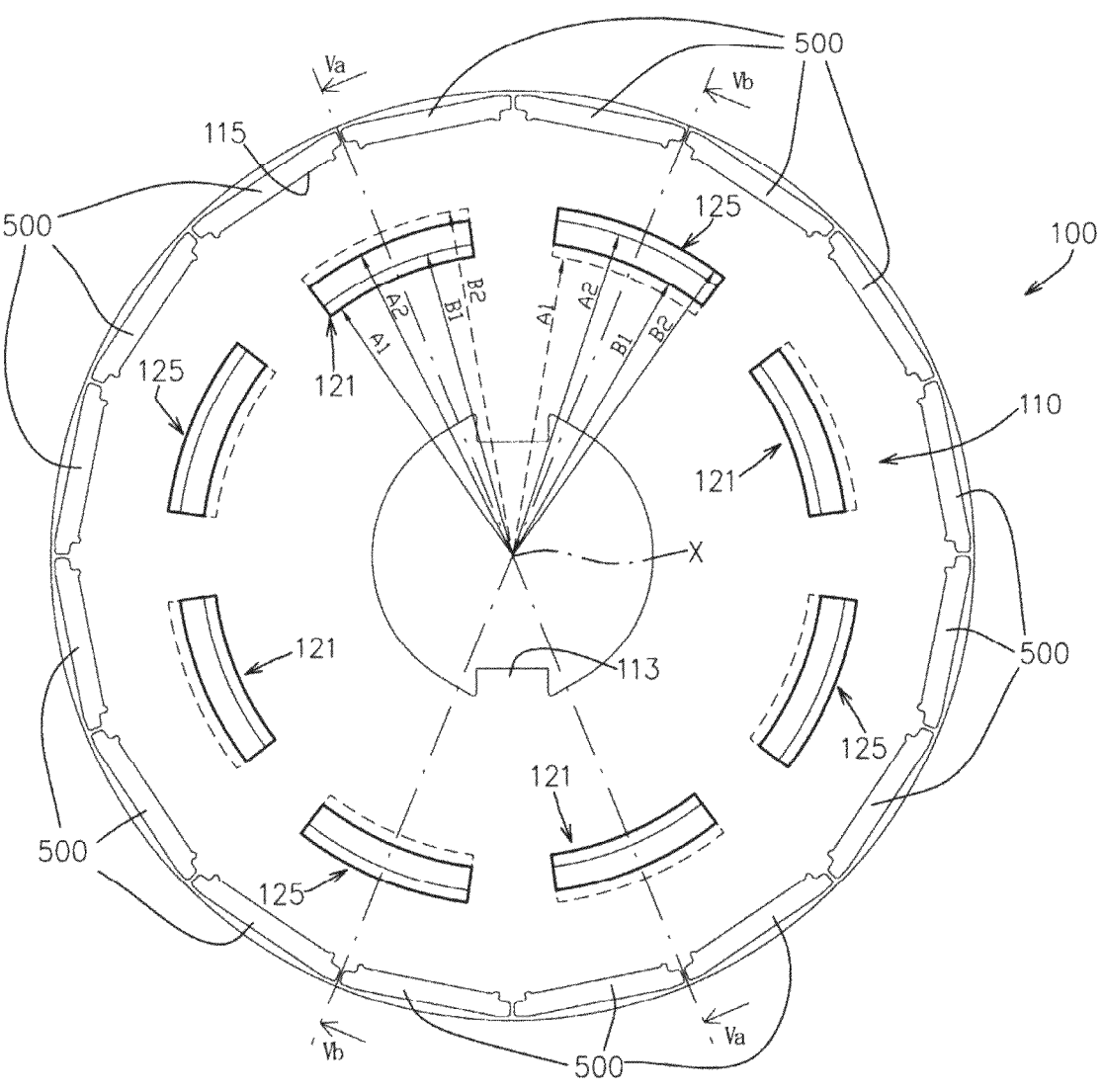
FIG. 4 is a plan view of the rotor unit in the state illustrated in FIG. 3.

FIG. 3 and FIG. 4 are a perspective view and a plan view, respectively, of the rotor unit 100 (hereinafter referred to as "pre-assembly" as appropriate) from which a first end-face side holder 300 (1) and a second end-face side holder 300 (2) described below are removed.

As illustrated in FIG. 1 to FIG. 4, the rotor unit 100 includes a rotor main body 110, a magnet 500 fixed to the rotor main body 110, and the first end-face side holder 300 (1) and the second end-face side holder 300 (2) which are magnet holders 300 and are attached to a first end face 110 (1) on one side in the rotation axis direction of the rotor main body 110 and a second end face 110 (2) on the other side in the rotation axis direction, respectively.

As illustrated in FIG. 3 and FIG. 4, the rotor main body 110 is provided with a shaft hole 112, which is open to at least the first end face 110 (1) on the rotation axis X and has the rotor rotation shaft 10 inserted thereinto, a magnet attachment hole 115, which is open to at least the first end face 110 (1) at a position away from the shaft hole 112 outward in the radial direction and has the magnet 500 attached thereto, and a hook hole, which is open to at least the first end face 110 (1) at a position different from the shaft hole 112 and the magnet attachment hole 115 in the radial direction.

As illustrated in FIG. 1 to FIG. 3, according to the present embodiment, the rotor main body 110 is formed by fixing a plurality of magnetic flat plates 150 having the identical configuration in a laminated state. The configuration of the magnetic flat plate 150 will be described below.

According to the present embodiment, the shaft hole 112 is a through-hole that is also open to the second end face 110 (2) in addition to the first end face 110 (1) of the rotor main body 110.

The shaft hole 112 is provided with a rotor main-body side engagement portion 113 to couple the rotor rotation shaft 10 and the rotor main body 110 so as to disable a relative rotation around the rotation axis. The rotor rotation shaft 10 is integrally or separately provided with a rotor rotation-shaft side engagement portion (not illustrated) that engages with the rotor main-body side engagement portion 113 in a recessed-protruding manner.

According to the present embodiment, as illustrated in FIG. 2 to FIG. 4, the rotor main-body side engagement portion 113 has a protruding shape that protrudes inward in the radial direction from an inner peripheral surface of the shaft hole 112. In this case, the rotor rotation-shaft side engagement portion has a recessed shape into which the protruding rotor main-body side engagement portion 113 is fitted.

Alternatively, the rotor main-body side engagement portion 113 may have a recessed shape that is recessed outward in the radial direction from the inner peripheral surface of the shaft hole 112. In this case, the rotor rotation-shaft side engagement portion has a protruding shape to be fitted into the recessed rotor main-body side engagement portion 113. Further, the protruding rotor rotation-shaft side engagement portion may be formed integrally with the rotor rotation shaft 10 or may be formed separately from the rotor rotation shaft.

According to the present embodiment, the magnet attachment hole 115 is also a through-hole that is open to the second end face 110 (2) in addition to the first end face 110 (1) of the rotor main body 110.

As illustrated in FIG. 3 and FIG. 4, according to the present embodiment, the plurality of (16 in the illustrated configuration) magnet attachment holes 115 is arranged along the circumferential direction on the outermost edge in the radial direction, and the magnet 500 is inserted into each of the magnet attachment holes 115.

The hook holes are holes into which first insertion arms 321 and second insertion arms 325, described below, of the first end-face side holder 300 (1) are inserted. According to the present embodiment, the hook hole is also a through-hole that is open to the second end face 110 (2) in addition to the first end face 110 (1) of the rotor main body 110.

As illustrated in FIG. 3 and FIG. 4, according to the present embodiment, the hook holes are arranged along the circumferential direction between the shaft hole 112 and the magnet attachment holes 115 with respect to the radial direction.

Figures 5A, 5B:
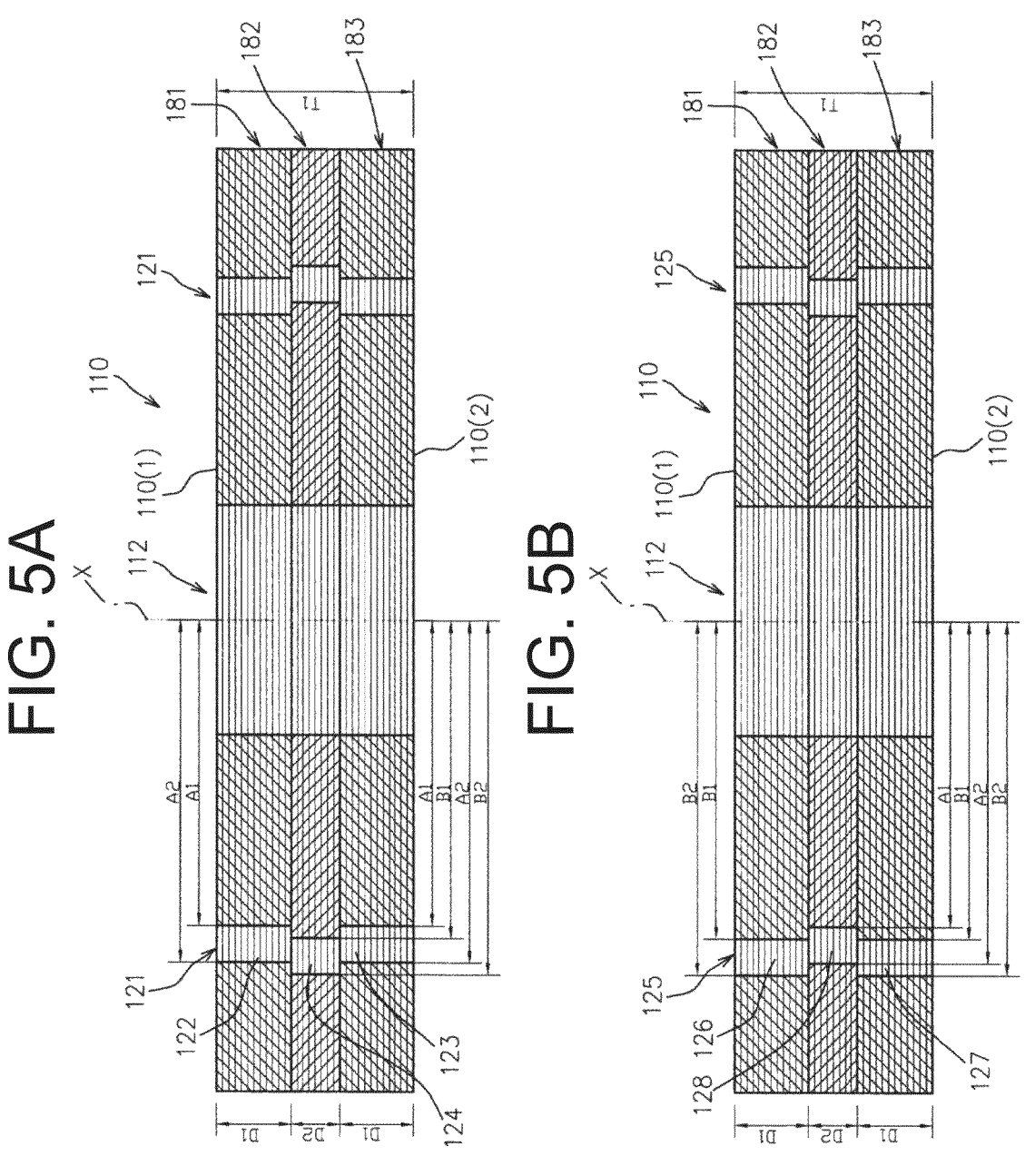
FIG. 5A and FIG. 5B are cross-sectional views taken along the lines Va-Va and Vb-Vb in FIG. 4, respectively.

FIG. 5A and FIG. 5B are cross-sectional views taken along the lines Va-Va and Vb-Vb in FIG. 4, respectively.

As illustrated in FIG. 3 to FIG. 5B, according to the present embodiment, the hook holes include first hook holes 121 and second hook holes 125 that have the identical opening shape on the first end face 110 (1) and the second end face 110 (2) and different opening positions on the first end face 110 (1) and the second end face 110 (2).

Specifically, as illustrated in FIG. 5A, the first hook hole 121 includes a first hook-hole first end-face side region 122 extending by a predetermined depth D1 in the axial direction from an outer end portion opened on the first end face 110 (1) toward the second end face 110 (2), a first hook-hole second end-face side region 123 extending by the predetermined depth D1 in the axial direction from an outer end portion opened on the second end face 110 (2) toward the first end face 110 (1), and a first hook-hole intermediate region 124 communicating between the first hook-hole first end-face side region 122 and the first hook-hole second end-face side region 123 by a predetermined depth D2.

In the first hook-hole first end-face side region 122 and the first hook-hole second end-face side region 123, the radial distance between a circumferentially extending edge on the inner side in the radial direction and the rotation axis X is A1, and the radial distance between a circumferentially extending edge on the outer side in the radial direction and the rotation axis X is A2.

Conversely, in the first hook-hole intermediate region 124, the radial distance between a circumferentially extending edge on the inner side in the radial direction and the rotation axis X is B1 (where A1<B1<A2), and the radial distance between a circumferentially extending edge on the outer side in the radial direction and the rotation axis X is B2 (where A2<B2).

With this configuration, in the first hook hole 121, an outward step extending outward in the radial direction from an axial inner end portion of the first hook-hole first end-face side region 122 is formed between the first hook-hole first end-face side region 122 and the first hook-hole intermediate region 124, and an outward step extending outward in the radial direction from an axial inner end portion of the first hook-hole second end-face side region 123 is formed between the first hook-hole second end-face side region 123 and the first hook-hole intermediate region 124. The outward step serves as a first hook-portion locking portion in which a first hook portion 331, described below, of the first end-face side holder 300 (1) is locked.

Conversely, as illustrated in FIG. 5B, the second hook hole 125 includes a second hook-hole first end-face side region 126 extending by the predetermined depth D1 in the axial direction from an outer end portion opened on the first end face 110 (1) toward the second end face 110 (2), a second hook-hole second end-face side region 127 extending by the predetermined depth D1 in the axial direction from an outer end portion opened on the second end face 110 (2) toward the first end face 110 (1), and a second hook-hole intermediate region 128 communicating between the second hook-hole first end-face side region 126 and the second hook-hole second end-face side region 127 by the predetermined depth D2.

In the second hook-hole first end-face side region 126 and the second hook-hole second end-face side region 127, the radial distance between a circumferentially extending edge on the inner side in the radial direction and the rotation axis X is B1, and the radial distance between a circumferentially extending edge on the outer side in the radial direction and the rotation axis X is B2.

Conversely, in the second hook-hole intermediate region 128, the radial distance between a circumferentially extending edge on the inner side in the radial direction and the rotation axis X is A1, and the radial distance between a circumferentially extending edge on the outer side in the radial direction and the rotation axis X is A2.

With this configuration, in the second hook hole 125, an inward step extending inward in the radial direction from an axial inner end portion of the second hook-hole first end-face side region 126 is formed between the second hook-hole first end-face side region 126 and the second hook-hole intermediate region 128, and an inward step extending inward in the radial direction from an axial inner end portion of the second hook-hole second end-face side region 127 is formed between the second hook-hole second end-face side region 127 and the second hook-hole intermediate region 128. The inward step serves as a second hook-portion locking portion in which a second hook portion 335, described below, of the first end-face side holder 300 (1) is locked.

Figure 6:
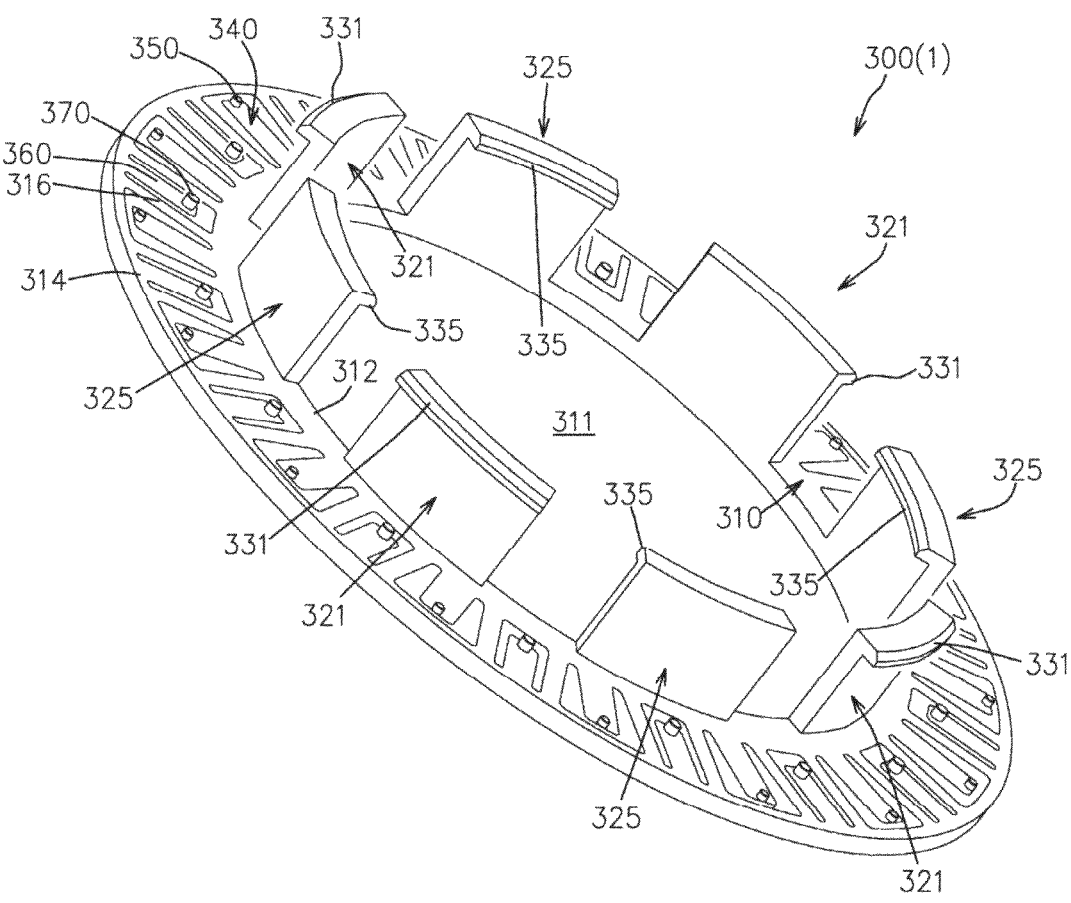
FIG. 6 is a perspective view of the first end-face side holder.
Figure 7:
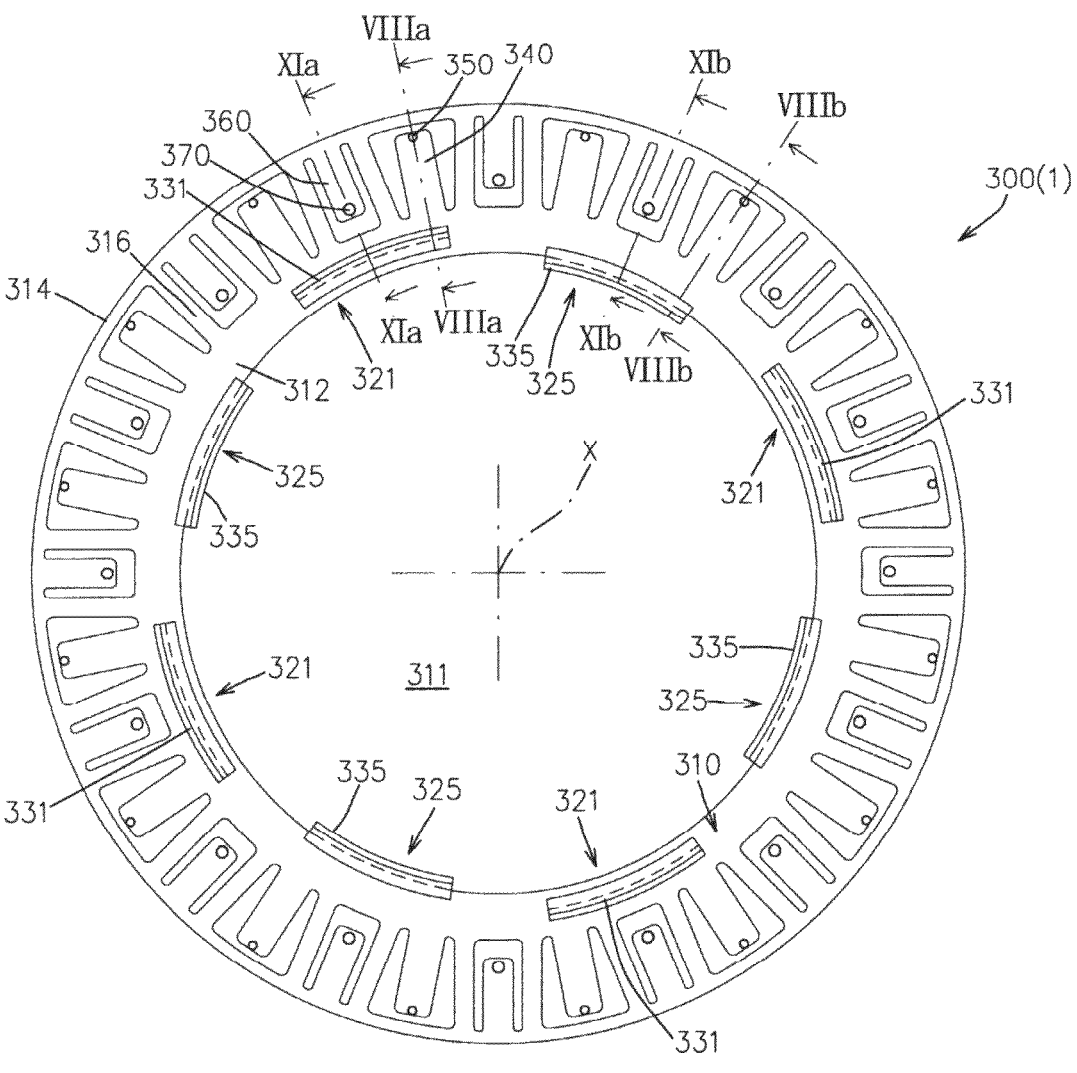
FIG. 7 is a bottom view of the first end-face side holder.
Figure 8A:
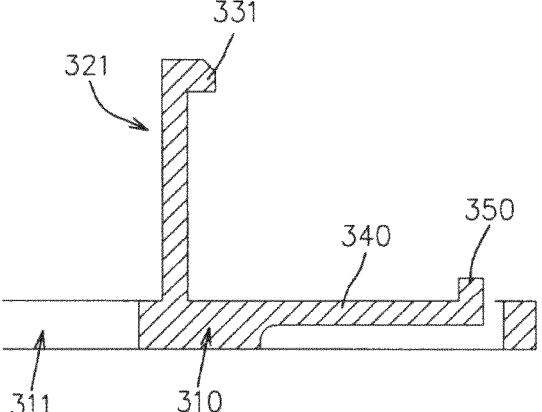
FIG. 8A and FIG. 8B are cross-sectional views taken along the lines VIIIa-VIIIa and VIIIb-VIIIb in FIG. 7, respectively.
Figure 8B:
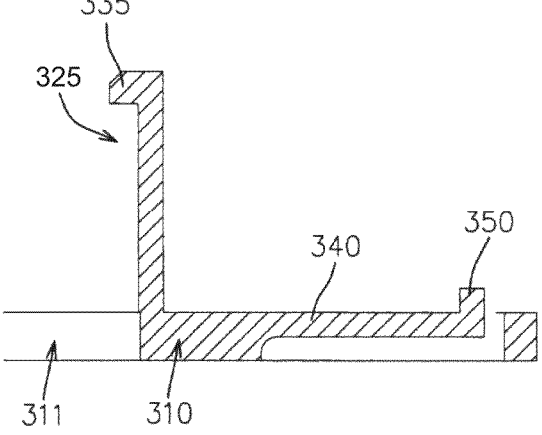

FIG. 6 and FIG. 7 are a perspective view and a bottom view of the first end-face side holder 300 (1), respectively. Both FIG. 6 and FIG. 7 illustrate the state of the first end-face side holder 300 (1) when viewed from the inner surface side opposed to the rotor main body 110. Furthermore, FIG. 8A and FIG. 8B are cross-sectional views taken along the lines VIIIa-VIIIa and VIIIb-VIIIb in FIG. 7, respectively.

Furthermore, according to the present embodiment, the second end-face side holder 300 (2) has the configuration identical to the first end-face side holder 300 (1). Therefore, the following description of the first end-face side holder 300 (1) also applies to the second end-face side holder 300 (2).

The first end-face side holder 300 (1) is made of, for example, a resin having appropriate elasticity, heat resistance, and durability and is preferably manufactured by using a synthetic resin material which is easily processed and suitable for mass production.

As illustrated in FIG. 6 to FIG. 8B, the first end-face side holder 300 (1) includes a flat-plate like holder main body 310, an insertion arm that extends from the holder main body 310 in a direction substantially perpendicular to the plate surface direction of the holder main body 310 and is capable of tilting by elastic deformation, a hook portion provided on a free end side of the insertion arm, an elastically deformable magnet pressing arm 340 extending from the holder main body 310, and a magnet pressing portion 350 provided on a free end side of the magnet pressing arm 340.

The holder main body 310 includes a central opening 311 having a size surrounding the shaft hole 112 in a plan view along the rotation axis X.

The insertion arm is configured to be inserted into the hook hole in an installation posture of the holder main body 310 in which the holder main body 310 is opposed to the first end face 110 (1) of the rotor main body 110 in a state where the center of the holder main body 310 matches the rotation axis X.

According to the present embodiment, as described above, the hook holes include the first hook holes 121 and the second hook holes 125, and the insertion arms include the first insertion arms 321 and the second insertion arms 325 to be inserted into the first hook holes 121 and the second hook holes 125, respectively, as illustrated in FIG. 6 and FIG. 7.

As illustrated in FIGS. 6, FIG. 8A, and FIG. 8B, the hook portions include the first hook portions 331 and the second hook portions 335 provided on the free end sides of the first insertion arms 321 and the second insertion arms 325, respectively.

The first hook portion 331 protrudes outward in the radial direction from the free end side of the first insertion arm 321 formed to have a length corresponding to the predetermined depth D1 and is lockable in the first hook-portion locking portion of the first hook hole 121 when the holder main body 310 is in the installation posture.

The second hook portion 335 protrudes inward in the radial direction from the free end side of the second insertion arm 325 formed to have a length corresponding to the predetermined depth D1 and is lockable in the second hook-portion locking portion of the second hook hole 125 when the holder main body 310 is in the installation posture.

Figures 9A, 9B:
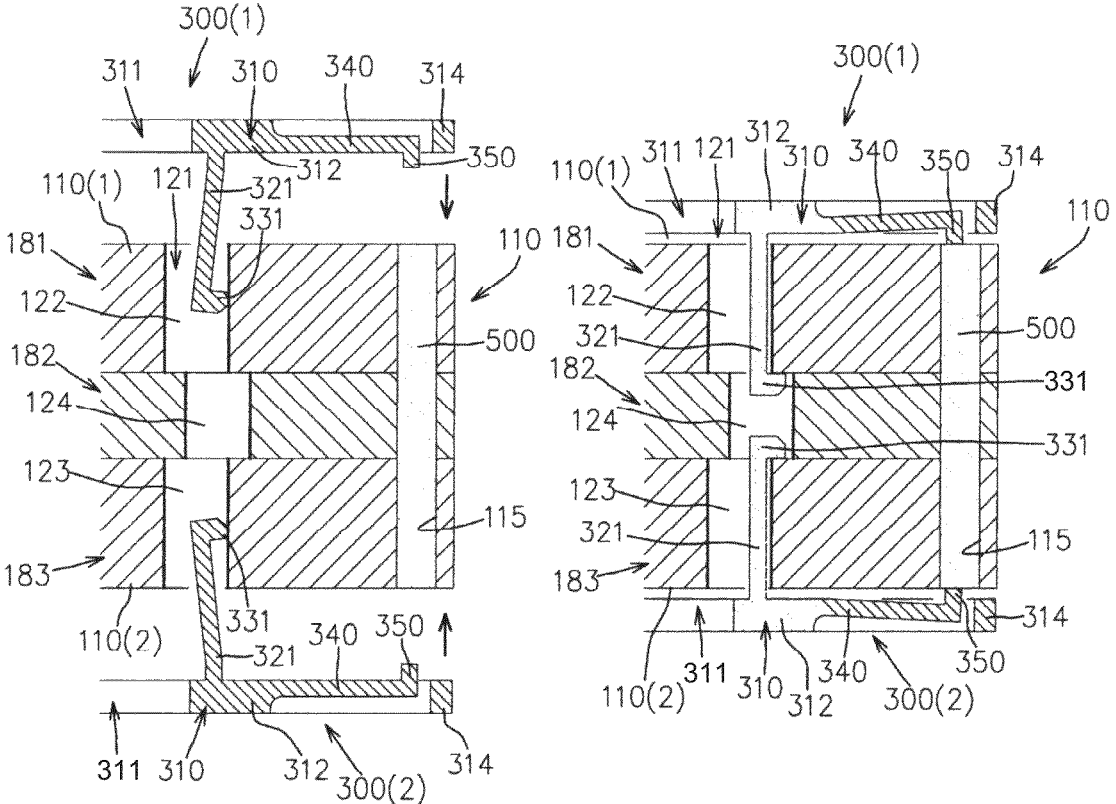
FIG. 9A and FIG. 9B are cross-sectional views taken along the line IX-IX in FIG. 2, illustrating the state in the middle of attaching the first end-face side holder and the second end-face side holder and the state after attaching the first end-face side holder and the second end-face side holder, respectively.
Figures 10A, 10B:
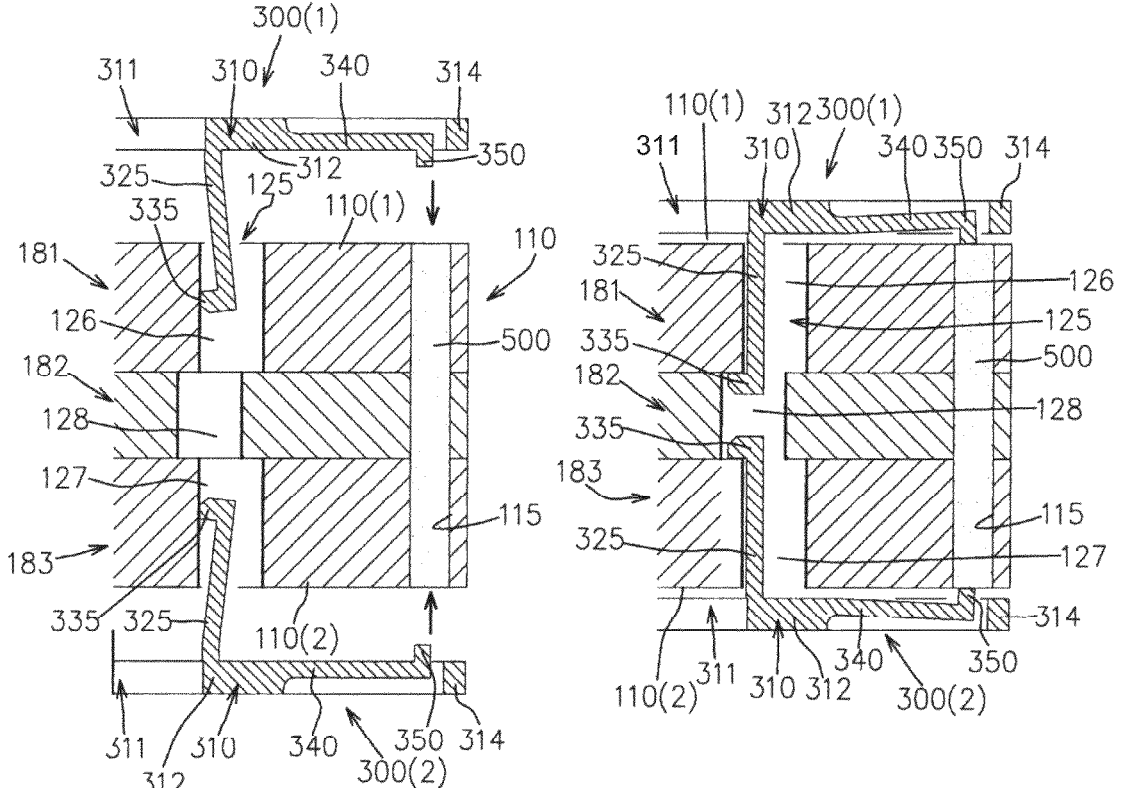
FIG. 10A and FIG. 10B are cross-sectional views taken along the line X-X in FIG. 2, illustrating the state in the middle of attaching the first end-face side holder and the second end-face side holder and the state after attaching the first end-face side holder and the second end-face side holder, respectively.

FIG. 9A and FIG. 9B and FIG. 10A and FIG. 10B are cross-sectional views taken along the lines IX-IX and X-X in FIG. 2, respectively. FIG. 9A and FIG. 10A illustrate the state in the middle of attaching the first end-face side holder 300 (1) and the second end-face side holder 300 (2) to the rotor main body 110, and FIGS. 9B and 10B illustrate the state after attaching the first end-face side holder 300 (1) and the second end-face side holder 300 (2) to the rotor main body 110.

As described above, according to the present embodiment, the steps provided in the first hook hole 121 and the second hook hole 125 extend along the radial direction.

Therefore, as illustrated in FIG. 9A and FIG. 10A, the first insertion arm 321 and the second insertion arm 325 are configured to be elastically deformable at least in the radial direction.

With this configuration, when the first end-face side holder 300 (1) is located at the installation position in a state where the center of the first end-face side holder 300 (1) matches the rotation axis X of the rotor main body 110 and the free ends of the first insertion arm 321 and the second insertion arm 325 are inserted into the first hook hole 121 and the second hook hole 125, respectively, the first insertion arm 321 and the second insertion arm 325 are delivered deeper into the corresponding ones of the hook holes 121 and 125 in a state where the free end side of the first insertion arm 321 is elastically deformed inward in the radial direction (FIG. 9A) and the free end side of the second insertion arm 325 is elastically deformed outward in the radial direction (FIG. 10A).

Then, when the first insertion arm 321 and the second insertion arm 325 reach predetermined installation positions, the first hook portion 331 and the second hook portion 335 reach the positions of the corresponding ones of the first hook-portion locking portion and the second hook-portion locking portion, the free end side of the first insertion arm 321 is bent back outward in the radial direction so that the first hook portion 331 is locked in the first hook-portion locking portion (FIG. 9B), and the free end side of the second insertion arm 325 is bent back inward in the radial direction so that the second hook portion 335 is locked in the second hook-portion locking portion (FIG. 10B). Thus, the first end-face side holder 300 (1) is fixed to the first end face 110 (1) of the rotor main body 110.

As illustrated in FIG. 4, according to the present embodiment, the first hook holes 121 provided with the first hook-portion locking portions serving as the outward steps and the second hook holes 125 provided with the second hook-portion locking portions serving as the inward steps are alternately arranged around the rotation axis X.

With this configuration, the locking structure by the first hook portion 331 protruding outward in the radial direction and the outward step and the locking structure by the second hook portion 335 protruding inward in the radial direction and the inward step are alternately arranged in the circumferential direction, and it is possible to stabilize the installation posture of the first end-face side holder 300 (1) with respect to the rotor main body 110.

In the magnet pressing arm 340, a base portion side thereof is elastically deformed so that the free end side may be tilted in a direction substantially perpendicular to the plate surface of the holder main body 310.

As illustrated in FIG. 6 to FIG. 10B, according to the present embodiment, the magnet pressing arm 340 extends from the holder main body 310 in a direction parallel to the plate surface of the holder main body 310.

According to the present embodiment, the magnet pressing portion 350 is formed on the free end side of the magnet pressing arm 340 so as to protrude along the rotation axis in a direction closer to the rotor main body 110 than the plane where the holder main body 310 is positioned and so as to be in contact with a first end face on one side in the rotation axis direction of the magnet 500 attached to the magnet attachment hole 115 in the installation posture of the holder main body 310.

As illustrated in FIG. 9B and FIG. 10B, with the magnet pressing arm 340 and the magnet pressing portion 350, in the installation posture of the holder main body 310 in which the first hook portion 331 and the second hook portion 335 are locked in the first hook-portion locking portion and the second hook-portion locking portion, respectively, and the holder main body 310 is opposed to and is located away from the first end face 110 (1) of the rotor main body 110 by a predetermined distance, the free end side of the magnet pressing arm 340 is elastically deformed in a direction away from the first end face 110 (1) of the rotor main body 110 in a state where the magnet pressing portion 350 is in contact with the first end face of the magnet 500, and thus the magnet pressing portion 350 is pressed against the first end face of the magnet 500 due to the inherent elasticity of the magnet pressing arm 340 accompanying the elastic deformation.

As illustrated in FIG. 6 and FIG. 7, according to the present embodiment, the first end-face side holder 300 (1) further includes a holder pressing arm 360 extending from the holder main body 310 and a holder pressing portion 370 provided on the free end side of the holder pressing arm 360.

Figure 11A:
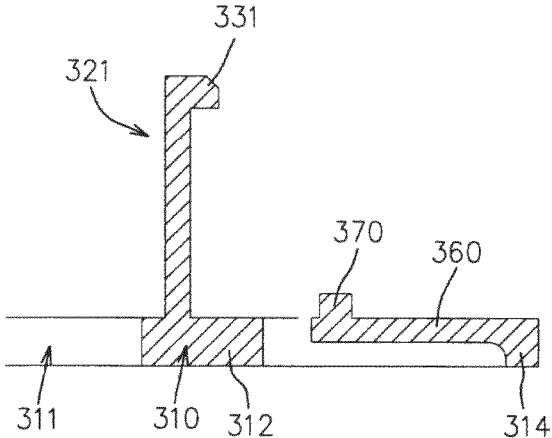
FIG. 11A and FIG. 11B are cross-sectional views taken along the lines XIa-XIa and XIb-XIb in FIG. 7, respectively.
Figure 11B:
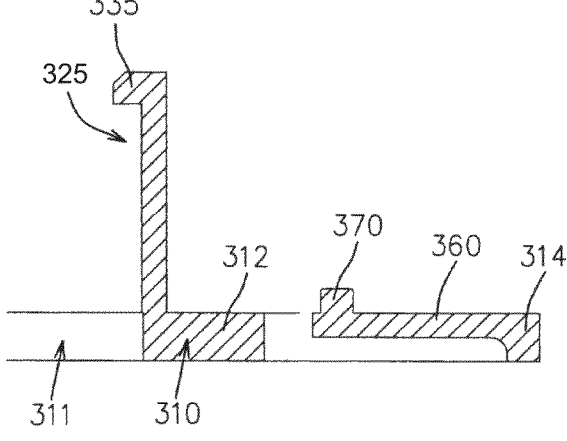

FIG. 11A and FIG. 11B are cross-sectional views taken along the lines XIa-XIa and XIb-XIb in FIG. 7, respectively.

In the holder pressing arm 360, a base portion side thereof is elastically deformed so that the free end side may be tilted in a direction substantially perpendicular to the plate surface of the holder main body 310.

As illustrated in FIGS. 6, FIG. 7, FIG. 11A, and FIG. 11B, according to the present embodiment, the holder pressing arm 360 extends from the holder main body 310 in a direction parallel to the plate surface of the holder main body 310.

According to the present embodiment, the holder pressing portion 370 protrudes along the rotation axis in a direction closer to the rotor main body 110 than the plane where the holder main body 310 is positioned so as to be in contact with the first end face 110 (1) of the rotor main body 110 in the installation posture of the holder main body 310.

Figures 12A, 12B:
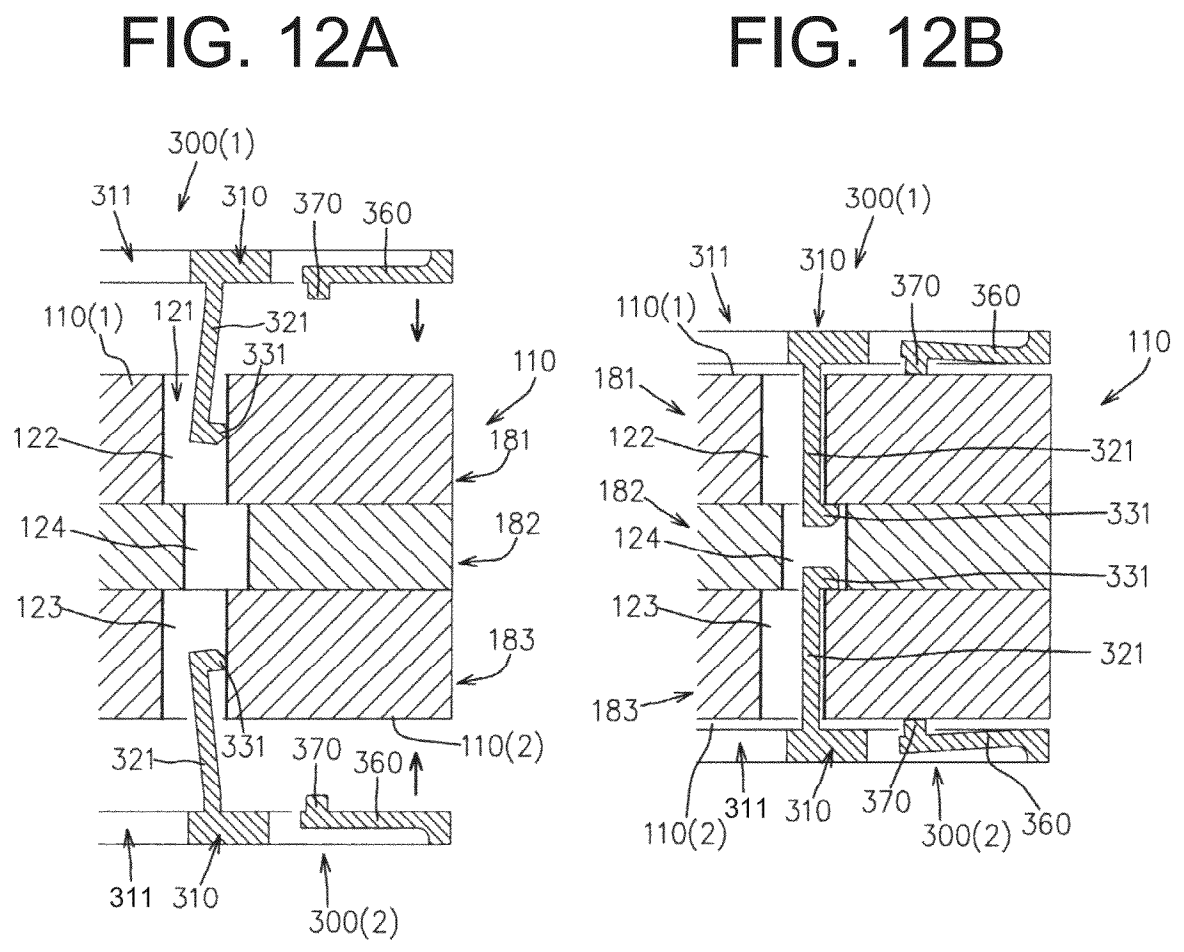
Figures 13A, 13B:
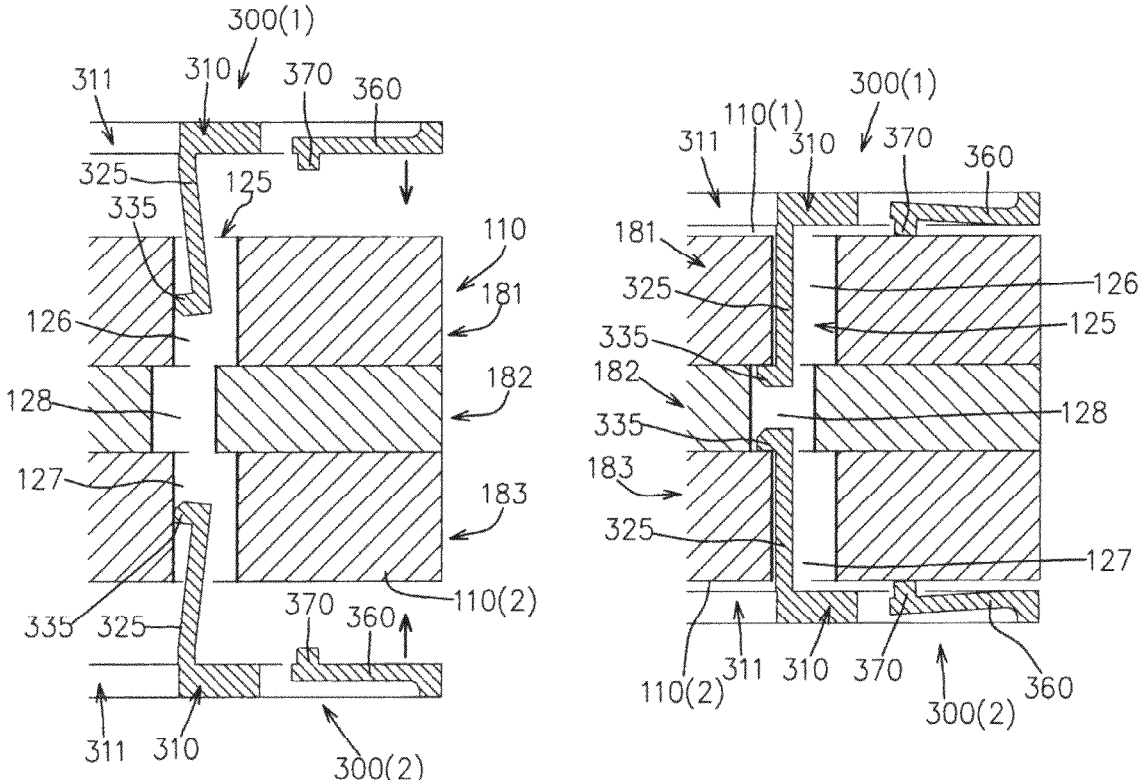
FIG. 13A and FIG. 13B are cross-sectional views taken along the line XIII-XIII in FIG. 2, illustrating the state in the middle of attaching the first end-face side holder and the second end-face side holder and the state after attaching the first end-face side holder and the second end-face side holder, respectively.

FIGS. 12A, FIG. 12B, FIG. 13A, and FIG. 13B are cross-sectional views taken along the line XII-XII and the line XIII-XIII in FIG. 2, respectively. FIG. 12A and FIG. 13A illustrate the state in the middle of attaching the first end-face side holder 300 (1) and the second end-face side holder 300 (2) to the rotor main body 110, and FIG. 12B and FIG. 13B illustrate the state after attaching the first end-face side holder 300 (1) and the second end-face side holder 300 (2) to the rotor main body 110.

As illustrated in FIG. 12B and FIG. 13B, the holder pressing arm 360 and the holder pressing portion 370 are configured such that, in the installation posture of the holder main body 310, the free end side of the holder pressing arm 360 is elastically deformed in a direction away from the first end face 110 (1) of the rotor main body 110 in a state where the holder pressing portion 370 is in contact with the first end face 110 (1) of the rotor main body 110 and thus the holder pressing portion 370 is pressed against the first end face 110 (1) of the rotor main body 110 due to the inherent elasticity of the holder pressing arm 360 accompanying the elastic deformation.

The first end-face side holder 300 (1) includes the holder pressing arm 360 and the holder pressing portion 370, and therefore, when there is a manufacturing error in the depth from the first end face 110 (1) of the rotor main body 110 to the first hook-portion locking portion or the axial length from the holder main body 310 to the first hook portion 331 of the first insertion arm 321, looseness of the first end-face side holder 300 (1) may be absorbed, and further installation stabilization may be achieved.

Furthermore, according to the present embodiment, as illustrated in FIG. 7, the magnet pressing arm 340 and the holder pressing arm 360 extend in opposite directions.

Specifically, the magnet pressing arm 340 is positioned on one of the outer side and the inner side in the radial direction (the outer side in the radial direction in FIG. 7) as the magnet pressing arm 340 extends from the base end side to the free end side, and the holder pressing arm 360 is positioned on the other one of the inner side and the outer side in the radial direction (the inner side in the radial direction in FIG. 7) as the holder pressing arm 360 extends from the base end side to the free end side.

With this configuration, the installation posture of the first end-face side holder 300 (1) may be further stabilized.

As illustrated in FIG. 6 and FIG. 7, according to the present embodiment, the holder main body 310 includes an inner ring body 312 defining the central opening 311, an outer ring body 314 surrounding the inner ring body 312, and a plurality of bridges 316 coupling the inner ring body 312 and the outer ring body 314.

As illustrated in FIG. 7, the bridges 316 are arranged with gaps in the circumferential direction around the rotation axis.

The magnet pressing arms 340 and the holder pressing arms 360 are arranged in the gaps alternately in the circumferential direction.

Specifically, the magnet pressing arm 340 is arranged in a first gap, the holder pressing arm 360 is arranged in a second gap adjacent in the circumferential direction, the magnet pressing arm 340 is arranged in a third gap adjacent in the circumferential direction, the holder pressing arm 360 is arranged in a fourth gap adjacent in the circumferential direction, and then the magnet pressing arm 340 and the holder pressing arm 360 are alternately arranged in the circumferential direction.

A base end side of the magnet pressing arm 340 is positioned at one of an outer edge of the inner ring body 312 and an inner edge of the outer ring body 314 and extends therefrom in the radial direction (extends outward in the radial direction from the inner ring body 312 in the configuration illustrated in the drawing) to form a free end. A base end side of the holder pressing arm 360 is positioned at the other one of the outer edge of the inner ring body 312 and the inner edge of the outer ring body 314 and extends therefrom in the radial direction (extends inward in the radial direction from the outer ring body 314 in the configuration illustrated in the drawing) to form a free end.

Figure 14:
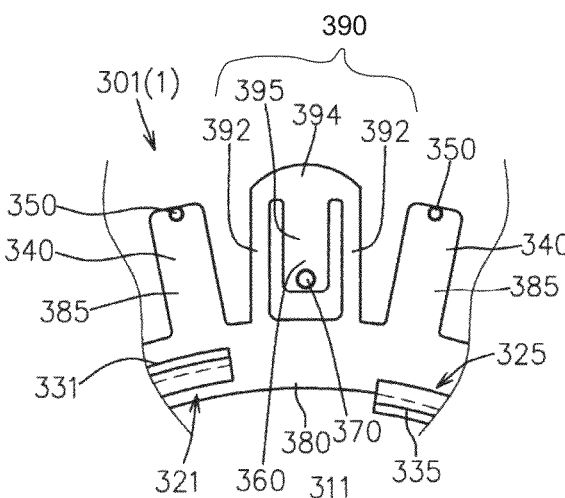
FIG. 14 is a partial bottom view of a modification of the first end-face side holder of the rotor unit according to the first embodiment.

FIG. 14 is a bottom view illustrating a first end-face side holder 301 (1) according to a modification applicable instead of the first end-face side holder 300 (1) (a view from the side of the inner surface of the first end-face side holder 301 (1) opposed to the rotor main body 110). In the drawings, the same members as those in the present embodiment are denoted by the same reference numerals, and the description thereof will be omitted as appropriate.

As illustrated in FIG. 14, the first end-face side holder 301 (1) includes a ring body 380 defining the central opening 311, a first arm 385 extending from the ring body 380 in the radial direction (outward in the radial direction in FIG. 14), and a support frame 390 extending from the ring body 380 in the radial direction, and the first arms 385 and the support frames 390 are alternately arranged in the circumferential direction around the rotation axis.

The support frame 390 includes a pair of radially extending arms 392 extending to one side in the radial direction (outward in the radial direction in FIG. 14) while being separated from each other in the circumferential direction with a gap therebetween, a coupling arm 394 coupling free end sides of the pair of radially extending arms 392, and a second arm 395 extending from the coupling arm 394 to the other side in the radial direction (inward in the radial direction in FIG. 14) in the gap.

In this configuration, one of the first arm 385 and the second arm 395 functions as the magnet pressing arm 340, and the other one of the first arm 385 and the second arm 395 serves as the holder pressing arm 360.

In the configuration illustrated in FIG. 14, the first arm 385 functions as the magnet pressing arm 340, and the second arm 395 functions as the holder pressing arm 360.

Next, the configuration of the magnetic flat plate 150 will be described in detail. According to the present embodiment, the rotor main body 110 is formed of the common magnetic flat plates 150 having the identical shape, and the hook-portion locking portion is formed inside the hook hole by devising the assembling direction. Thus, it is sufficient to prepare only one mold for manufacturing the magnetic flat plates 150.

Figures 15A, 15B:
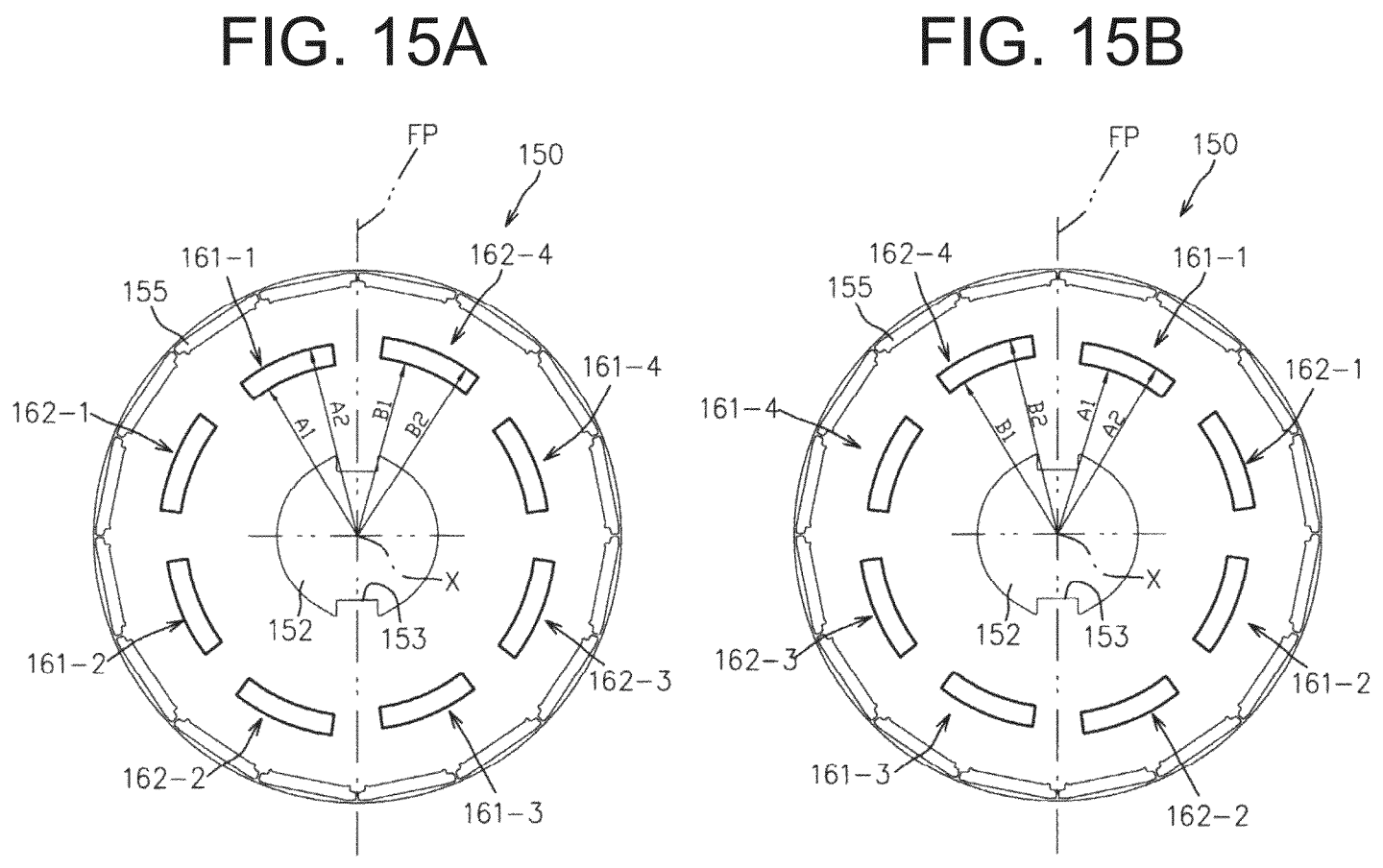

FIG. 15A and FIG. 15B are end-face diagrams illustrating an end face (hereinafter referred to as "first surface") on one side in the plate thickness direction of the magnetic flat plate 150 and an end face (hereinafter referred to as "second surface") on the other side in the plate thickness direction, respectively. Furthermore, FIG. 15A and FIG. 15B illustrate the state where the position of a virtual center plane FP that passes through the rotation axis X and is perpendicular to the plane of the magnetic flat plate 150 is aligned around the rotation axis X. Specifically, FIG. 15B illustrates the state where the magnetic flat plate 150 of FIG. 15A is turned over with the virtual center plane FP fixed.

As illustrated in FIG. 15A and FIG. 15B, the magnetic flat plate 150 includes a shaft-hole opening 152 forming the shaft hole 112, a magnet opening 155 forming the magnet attachment hole 115, and a plurality of hook openings arranged along the circumferential direction around the rotation axis X to form the hook holes.

As illustrated in FIG. 15A and FIG. 15B, the hook openings include a first opening 161 having a radial distance A1 between a circumferentially extending edge on the inner side in the radial direction and the rotation axis X and a radial distance A2 between a circumferentially extending edge on the outer side in the radial direction and the rotation axis and includes a second opening 162 having a radial distance B1 (where A1<B1<A2) between a circumferentially extending edge on the inner side in the radial direction and the rotation axis and a radial distance B2 (where A2<B2) between a circumferentially extending edge on the outer side in the radial direction and the rotation axis.

According to the present embodiment, the hook openings include four first openings 161-1 to 161-4 and four second openings 162-1 to 162-4.

As illustrated in FIG. 15A and FIG. 15B, the first openings 161 and the second openings 162 are arranged symmetrically to each other in the circumferential direction with respect to the virtual center plane FP.

Specifically, when the one magnetic flat plate 150 having the first surface facing one side in the rotation axis direction and the other magnetic flat plate 150 having the second surface facing one side in the rotation axis direction are overlapped with each other with the aligned virtual center planes FP, the first openings 161 and the second openings 162 of the one magnetic flat plate 150 are aligned in the circumferential positions with the second openings 162 and the first openings 161 of the other magnetic flat plate 150.

Figure 16:
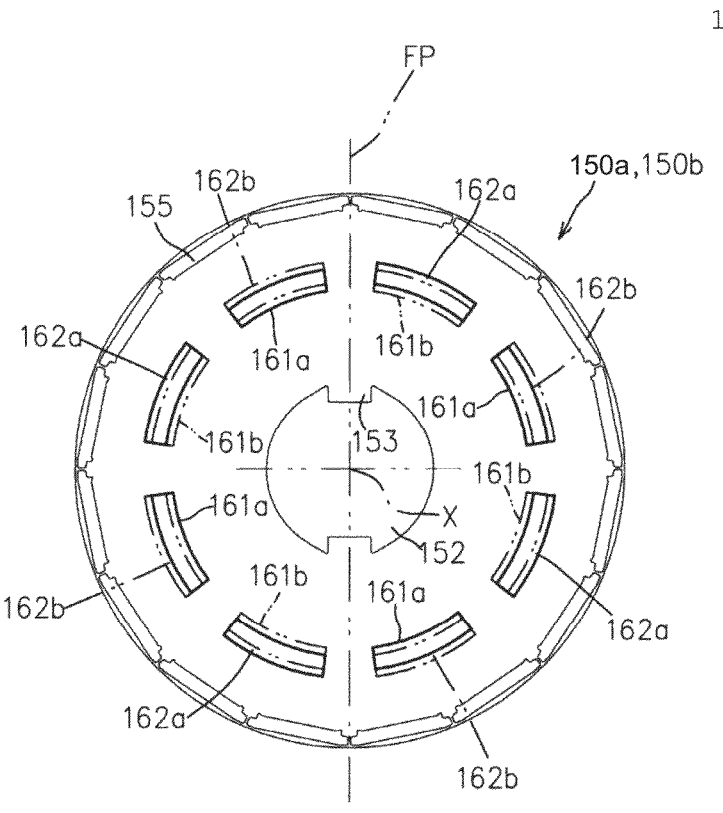
FIG. 16 is a plan view illustrating the state where a first magnetic flat plate having the first surface facing one side in the rotation axis direction and a second magnetic flat plate having the second surface facing one side in the rotation axis direction are overlapped with each other with aligned virtual center planes FP.

FIG. 16 is a plan view illustrating the state where a first magnetic flat plate 150a having the first surface facing one side in the rotation axis direction and a second magnetic flat plate 150b having the second surface facing one side in the rotation axis direction are overlapped with each other with the aligned virtual center planes FP.

In FIG. 16, the second magnetic flat plate 150b is positioned on the other side of the first magnetic flat plate 150a in the rotation axis direction, hook openings 161a and 162a of the first magnetic flat plate 150a are indicated in solid lines, and hook openings 161b and 162b of the second magnetic flat plate 150b are indicated in dashed-two dotted lines.

As illustrated in FIG. 16, when the first magnetic flat plate 150a in a first posture (front) having the first surface facing one side in the rotation axis direction and the second magnetic flat plate 150b in a second posture (back) having the second surface facing one side in the rotation axis direction are overlapped with each other with the aligned virtual center planes FP, the first opening 161a of the first magnetic flat plate 150a and the second opening 162b of the second magnetic flat plate 150b are overlapped with each other such that the first opening 161a and the second opening 162b are aligned in the circumferential direction and misaligned in the radial direction with respect to the rotation axis X and the second opening 162a of the first magnetic flat plate 150a and the first opening 161b of the second magnetic flat plate 150b are overlapped with each other such that the second opening 162a and the first opening 161b are aligned in the circumferential direction and misaligned in the radial direction with respect to the rotation axis X.

The magnet openings 155 are arranged at equal intervals in the circumferential direction around the rotation axis X with respect to the virtual center plane FP, and therefore, even when the magnetic flat plates 150 are turned over and overlapped as described above, no positional deviation occurs. Thus, the magnet 500 may be smoothly fitted into the magnet attachment hole 115 having a depth equal to the thickness of the rotor main body 110 in the rotation axis direction.

As illustrated in FIGS. 15A, FIG. 15B, and FIG. 16, according to the present embodiment, the first openings 161 and the second openings 162 are alternately arranged along the circumferential direction.

Furthermore, according to the present embodiment, the first openings 161 and the second openings 162 have the identical opening shape (i.e., radial opening width and circumferential opening width).

As illustrated in FIGS. 15A, FIG. 15B, and FIG. 16, the shaft-hole openings 152 are arranged symmetrically with respect to the virtual center plane FP so as to completely match with each other when the first magnetic flat plate 150*a* having the first surface facing one side in the rotation axis direction and the second magnetic flat plate 150*b* having the second surface facing one side in the rotation axis direction are overlapped with each other with the aligned virtual center planes FP.

As described above, according to the present embodiment, the shaft hole 112 is provided with the rotor main-body side engagement portion 113 that engages with the rotor rotation-shaft side engagement portion (not illustrated) provided on the rotor rotation shaft 10 in a recessed-protruding manner.

Therefore, as illustrated in FIGS. 15A, FIG. 15B, and FIG. 16, in the shaft-hole opening 152 forming the shaft hole 112, an engagement-portion forming structure 153 forming the rotor main-body side engagement portion 113 is provided in a symmetrical shape with respect to the virtual center plane FP.

The magnet openings 155 are arranged symmetrically with respect to the virtual center plane FP so as to completely match with each other when the first magnetic flat plate 150*a* having the first surface facing one side in the rotation axis direction and the second magnetic flat plate 150*b* having the second surface facing one side in the rotation axis direction are overlapped with each other with the aligned virtual center planes FP.

As illustrated in FIG. 5A and FIG. 5B, according to the present embodiment, the rotor main body 110 includes first to third magnetic assemblies 181 to 183 that are laminated and fixed in this order from one side to the other side in the rotation axis direction.

Each of the first magnetic assembly 181 to the third magnetic assembly 183 is formed by laminating and fixing the magnetic flat plates 150 having the identical configuration in a state where the magnetic flat plates 150 face in the identical direction with regard to the plate thickness direction and the openings of the identical type are aligned with each other.

That is, the first magnetic assembly 181 includes the assembly of a predetermined number of the magnetic flat plates 150 that are laminated and fixed in a state where the magnetic flat plates 150 face in the identical direction with regard to the plate thickness direction and the openings of the identical type are aligned with each other.

The second magnetic assembly 182 includes the assembly of any number of the magnetic flat plates 150 that are laminated and fixed in a state where the magnetic flat plates 150 face in the identical direction with regard to the plate thickness direction and the openings of the identical type are aligned with each other.

The third magnetic assembly 183 includes the assembly of the magnetic flat plates 150 that are the identical number to the first magnetic assembly 181 and that are laminated and fixed in a state where the magnetic flat plates 150 face in the identical direction with regard to the plate thickness direction and the openings of the identical type are aligned with each other.

The first magnetic assembly 181 to the third magnetic assembly 183 are laminated and fixed in this order from one side to the other side in the rotation axis direction in a state where, with regard to the plate thickness direction, the first surfaces of the magnetic flat plates 150 forming the first magnetic assembly 181 and the third magnetic assembly 183 face one side in the rotation axis direction and the second surfaces of the magnetic flat plates 150 forming the second magnetic assembly 182 face one side in the rotation axis direction and, with regard to the circumferential direction around the rotation axis X, the virtual center planes FP of the first magnetic assembly 181 to the third magnetic assembly 183 are aligned with each other.

In the rotor main body 110 in which the first magnetic assembly 181 to the third magnetic assembly 183 are fixed as described above, a radially outward step between the first opening 161 of the first magnetic assembly 181 and the second opening 162 of the second magnetic assembly 182 forms the first hook-portion locking portion, and a radially inward step between the second opening 162 of the first magnetic assembly 181 and the first opening 161 of the second magnetic assembly 182 forms the second hook-portion locking portion.

Therefore, the number of laminated magnetic flat plates 150 in the first magnetic assembly 181 (and the third magnetic assembly 183) is set in accordance with the axial distance of the hook portions 331 and 335 from the holder main body 310.

With this configuration, the rotor main body 110 including the shaft hole 112, the magnet attachment hole 115, and the hook holes 121 and 125 may be formed by using the magnetic flat plates 150 having a single shape. Therefore, the magnetic flat plates 150 may be manufactured by pressing with one mold, which may reduce the manufacturing cost.

Further, the first end-face side holder 300 (1) and the second end-face side holder 300 (2) may be commonly used for the rotor main body 110 (see FIG. 5) of a first specification having a rotation-axis direction thickness T1 in which the second magnetic assembly 182 formed of the m (for example, eight) magnetic flat plates 150 is sandwiched between the first magnetic assembly 181 and the third magnetic assembly 183 and for a rotor main body 110' (see FIG. 17) of a second specification having a rotation-axis direction thickness T2 in which a second magnetic assembly 182' formed of the number of magnetic flat plates 150 different from m is sandwiched between the first magnetic assembly 181 and the third magnetic assembly 183.

Figures 17A, 17B:
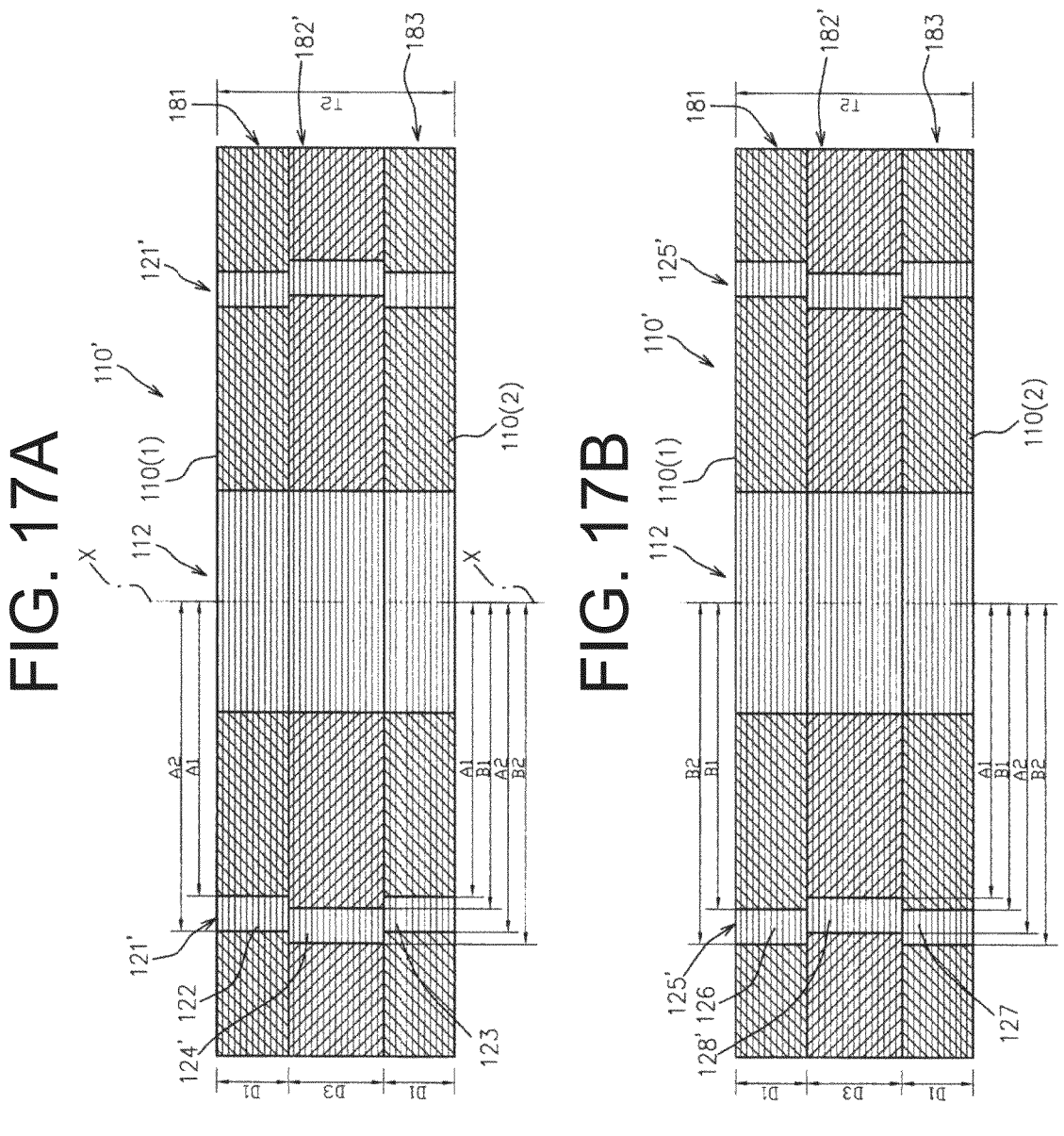
FIG. 17A and FIG. 17B are cross-sectional views of a rotor main body of a second specification different from the rotor main body in the rotor unit according to the first embodiment and are cross-sectional views corresponding to FIG. 5A and FIG. 5B, respectively.

FIG. 17A and FIG. 17B are cross-sectional views of the rotor main body 110' of the second specification corresponding to FIG. 5A and FIG. 5B, respectively. The rotor main body 110' of the second specification illustrated in FIG. 17A and FIG. 17B includes a first hook hole 121' and a second hook hole 125' instead of the first hook hole 121 and the second hook hole 125, as compared with the rotor main body 110.

The first hook hole 121' includes the first hook-hole first end-face side region 122 having the predetermined depth D1, the first hook-hole second end-face side region 123 having the predetermined depth D1, and a first hook-hole intermediate region 124' having a predetermined depth D3 and communicating between the first hook-hole first end-face side region 122 and the first hook-hole second end-face side region 123, where T2=D1+D3+D1.

The second hook hole 125' includes the second hook-hole first end-face side region 126 having the predetermined depth D1, the second hook-hole second end-face side region 127 having the predetermined depth D1, and a second hook-hole intermediate region 128' having the predetermined depth D3 and communicating between the second hook-hole first end-face side region 126 and the second hook-hole second end-face side region 127, where T2=D1+D3+D1.

Specifically, in the rotor main body 110', the first magnetic assembly 181 includes the number (eight in the illustrated configuration) of magnetic flat plates 150 such that the first hook-hole first end-face side region 122 and the second hook-hole first end-face side region 126 have the depth D1, the third magnetic assembly 183 includes the number (eight in the illustrated configuration) of magnetic flat plates 150 such that the first hook-hole second end-face side region 123 and the second hook-hole second end-face side region 127 have the depth D1, and the second magnetic assembly 182' includes the number (twelve in the illustrated configuration) of magnetic flat plates 150 such that the first hook-hole intermediate region 124' and the second hook-hole intermediate region 128' have the depth D3.

Second Embodiment

Another embodiment of the rotor unit according to the present invention will be described below with reference to the accompanying drawings.

A rotor unit 200 according to the present embodiment includes a rotor main body 210, the magnet 500 fixed to the rotor main body 210, and a first end-face side holder 400 (1) and a second end-face side holder 400 (2) that are magnet holders 400 attached to a first end face 210 (1) on one side in the rotation axis direction of the rotor main body 210 and a second end face 210 (2) on the other side in the rotation axis direction, respectively.

Figure 18:
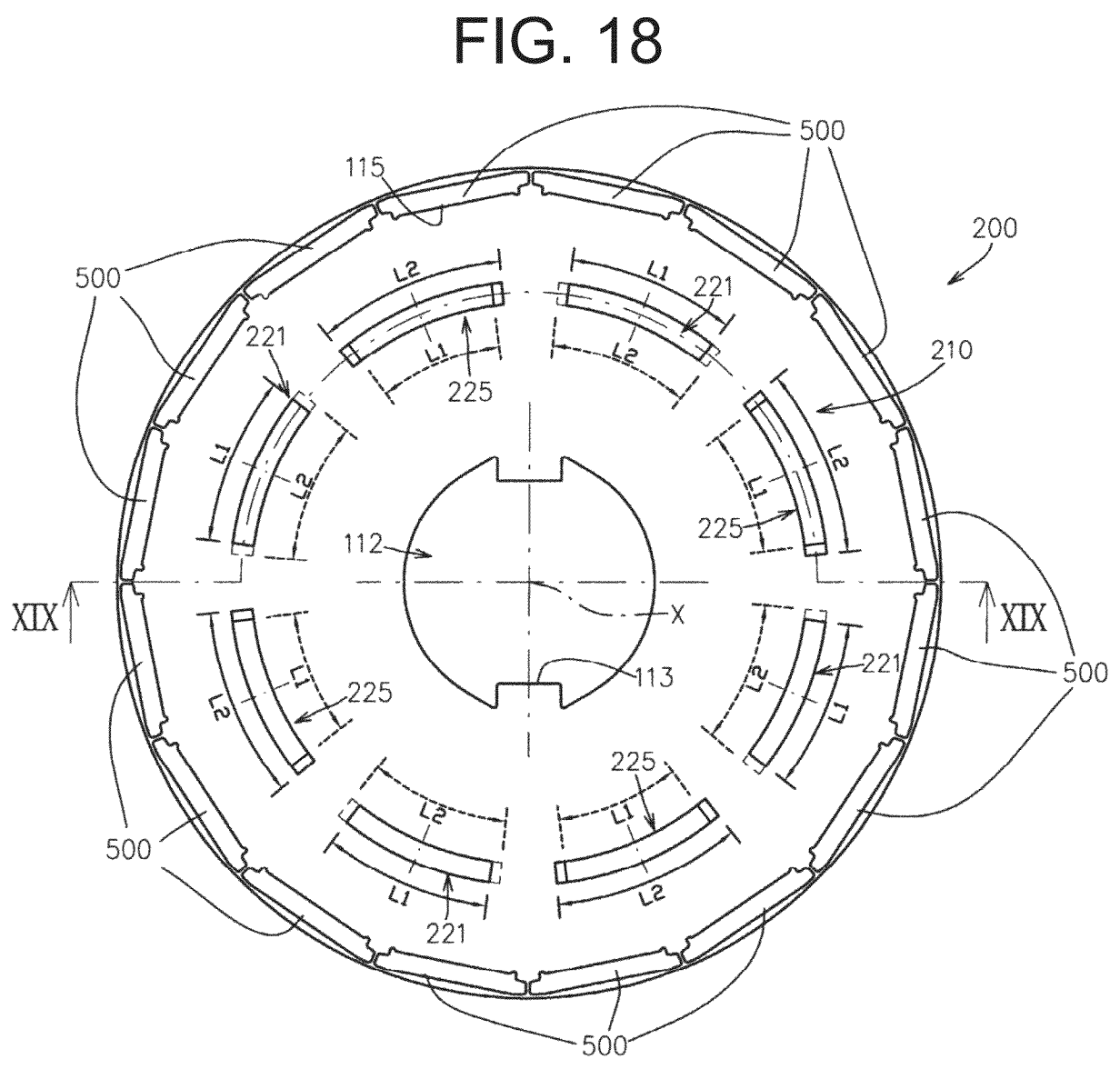
Figure 19:
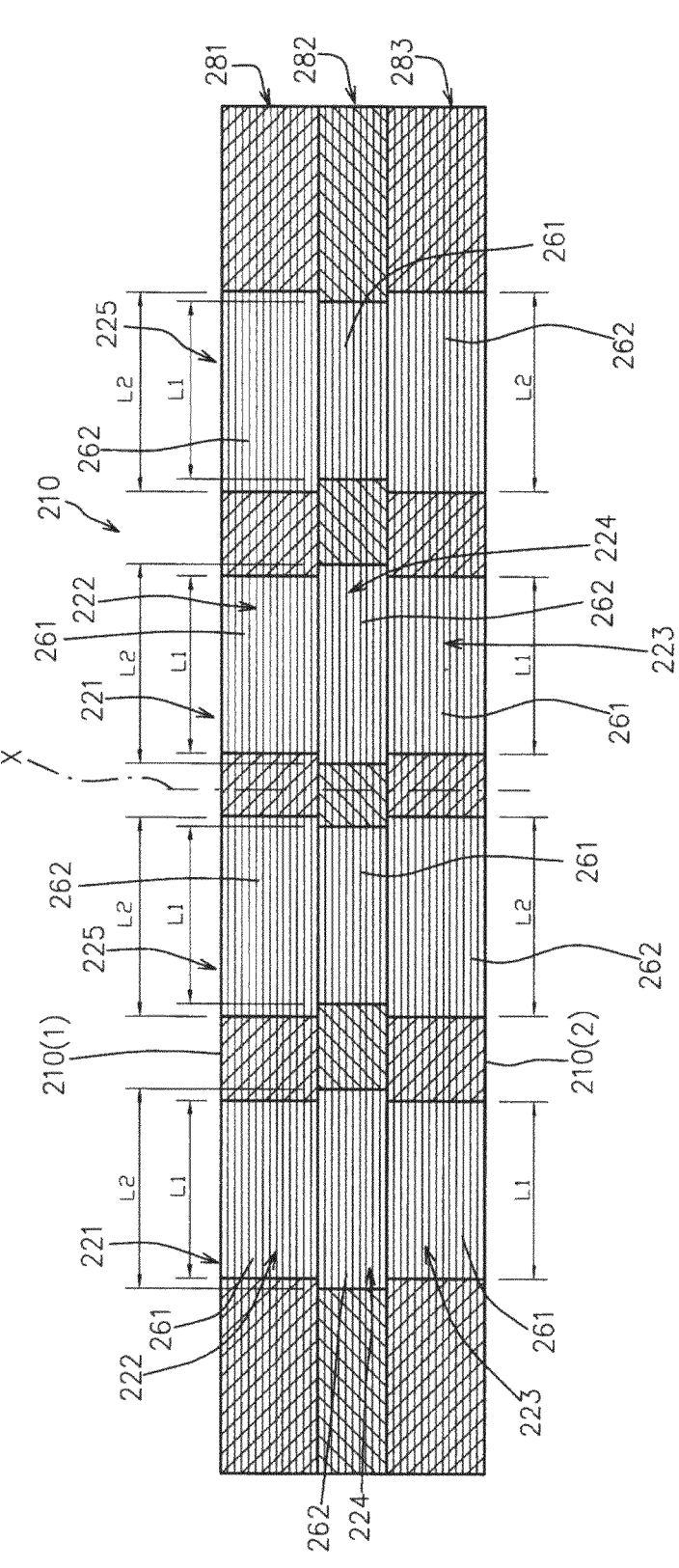
FIG. 19 is a cross-sectional view taken along the line XIX-XIX in FIG. 18.
Figure 20:
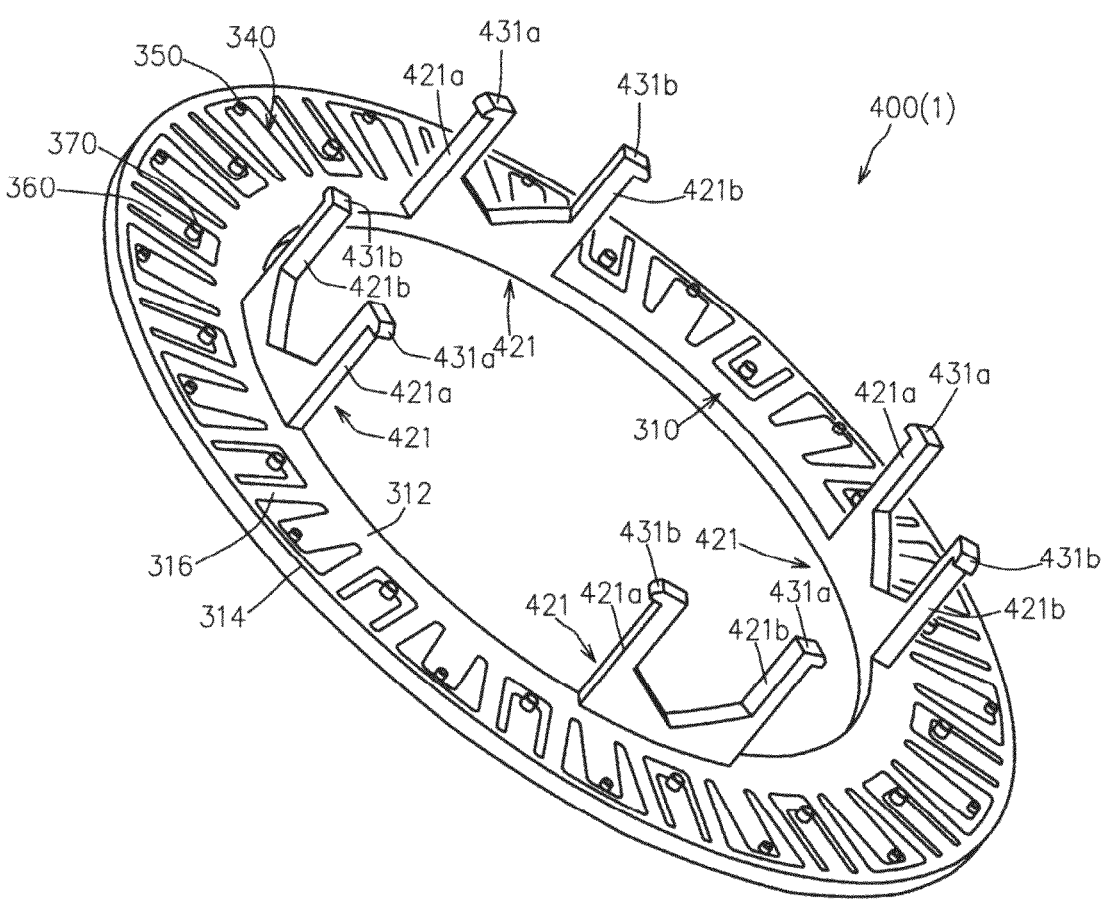
FIG. 20 is a perspective view of the first end-face side holder in the rotor unit according to the second embodiment and is a perspective view corresponding to FIG. 6.

FIG. 18 is a plan view of the rotor unit 200 in a state where the first end-face side holder 400 (1) and the second end-face side holder 400 (2) are removed and is a plan view corresponding to FIG. 4 according to the first embodiment. FIG. 19 is a cross-sectional view taken along the line XIX-XIX in FIG. 18. Furthermore, FIG. 20 is a perspective view of the first end-face side holder 400 (1) and is a perspective view corresponding to FIG. 6 according to the first embodiment. In the figures, the same members are denoted by the same reference numerals as in the first embodiment above, and the description thereof is omitted as appropriate.

In the rotor unit 100 according to the first embodiment, the locking portions extend in the radial direction, in which the hook portions 331 and 335 of the corresponding first end-face side holder 300 (1) and the second end-face side holder 300 (2) are locked.

Conversely, in the rotor unit 200 according to the present embodiment, locking portions extend in the circumferential direction, in which hook portions 431, described below, of the corresponding first end-face side holder 400 (1) and the second end-face side holder 400 (2) are locked.

As illustrated in FIG. 19, the rotor main body 210 includes first to third magnetic assemblies 281 to 283 that are laminated and fixed in this order from one side to the other side in the rotation axis direction.

Each of the first magnetic assembly 281 to the third magnetic assembly 283 is formed of magnetic flat plates 250 having a configuration different from that of the magnetic flat plates 150 according to the first embodiment.

Figures 21A, 21B:
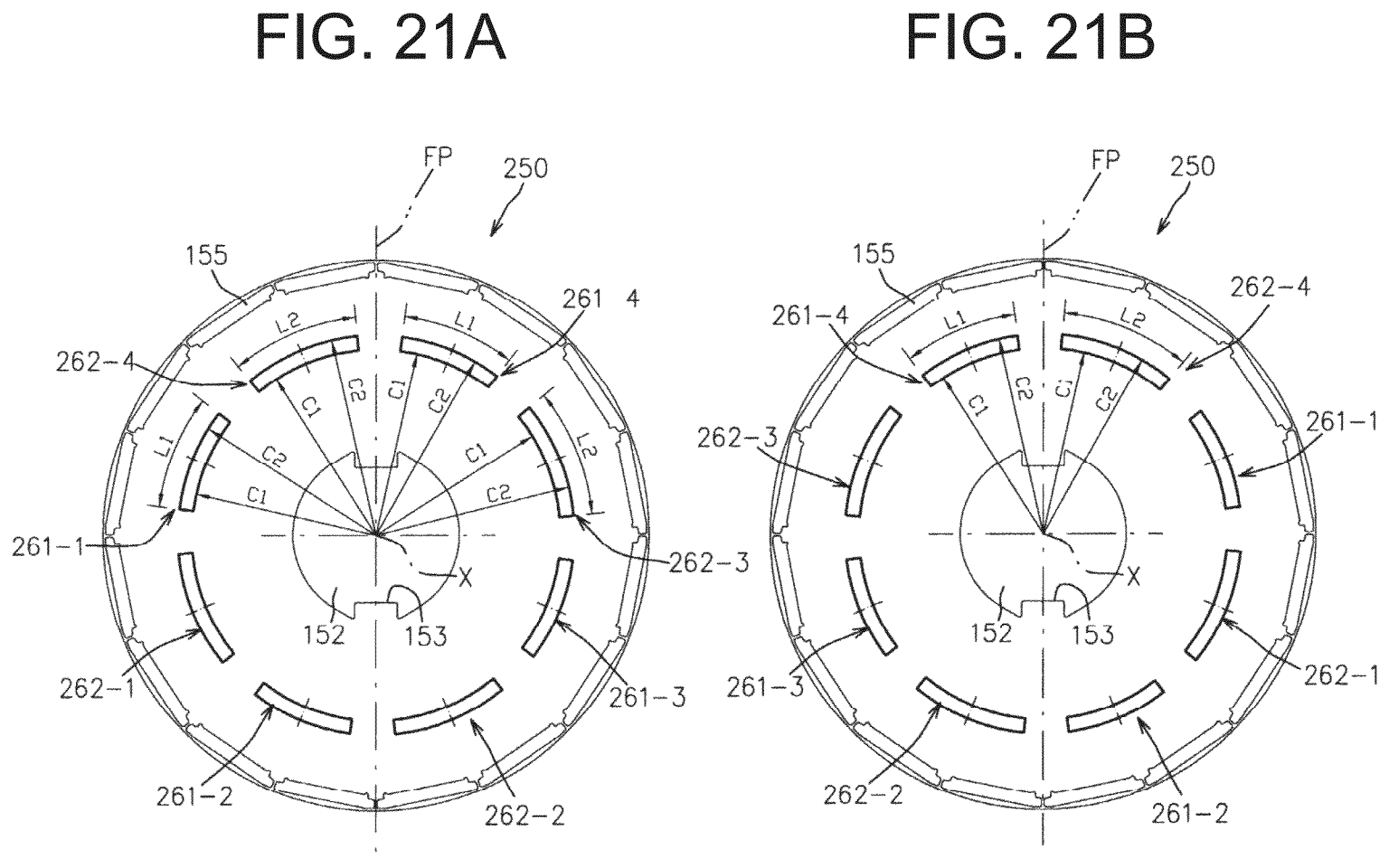

FIG. 21A and FIG. 21B are plan views of an end face (the first surface) on one side in the plate thickness direction of the magnetic flat plate 250 and an end face (the second surface) on the other side in the plate thickness direction, respectively. Further, FIG. 21A and FIG. 21B illustrate the state where the positions around the rotation axis X of the virtual center plane FP, which passes through the rotation axis X and is perpendicular to the plane of the magnetic flat plate 250, are aligned with each other. That is, FIG. 21B illustrates the state where the magnetic flat plate 250 of FIG. 21A is turned over with the virtual center plane FP fixed.

The magnetic flat plate 250 is different from the magnetic flat plate 150 in that the hook openings 161 and 162 are changed to a plurality of hook openings 261 and 262.

That is, as illustrated in FIG. 21A and FIG. 21B, the magnetic flat plate 250 includes the shaft-hole opening 152, the magnet openings 155, and the hook openings 261 and 262.

As illustrated in FIG. 21A and FIG. 21B, the hook openings 261 and 262 include first openings 261 having a circumferential length L1 and second openings 262 having a circumferential length L2 (where L2>L1).

Both the first opening 261 and the second opening 262 have a radial distance C1 between a circumferentially extending edge on the inner side in the radial direction and the rotation axis X and a radial distance C2 between a circumferentially extending edge on the outer side in the radial direction and the rotation axis.

According to the present embodiment, the hook openings 261 and, 262 include four first openings 261-1 to 261-4 and four second openings 262-1 to 262-4.

As illustrated in FIG. 21A and FIG. 21B, the first openings 261 and the second openings 262 are arranged symmetrically to each other in the radial direction with respect to the virtual center plane FP.

That is, when the one magnetic flat plate 250 having the first surface facing one side in the rotation axis direction and the other magnetic flat plate 250 having the second surface facing one side in the rotation axis direction are overlapped with each other with the aligned virtual center planes FP, the circumferential centers of the first opening 261 and the second opening 262 of the one magnetic flat plate 250 are aligned with the circumferential centers of the second opening 262 and the first opening 261 of the other magnetic flat plate 250, respectively.

Figure 22:
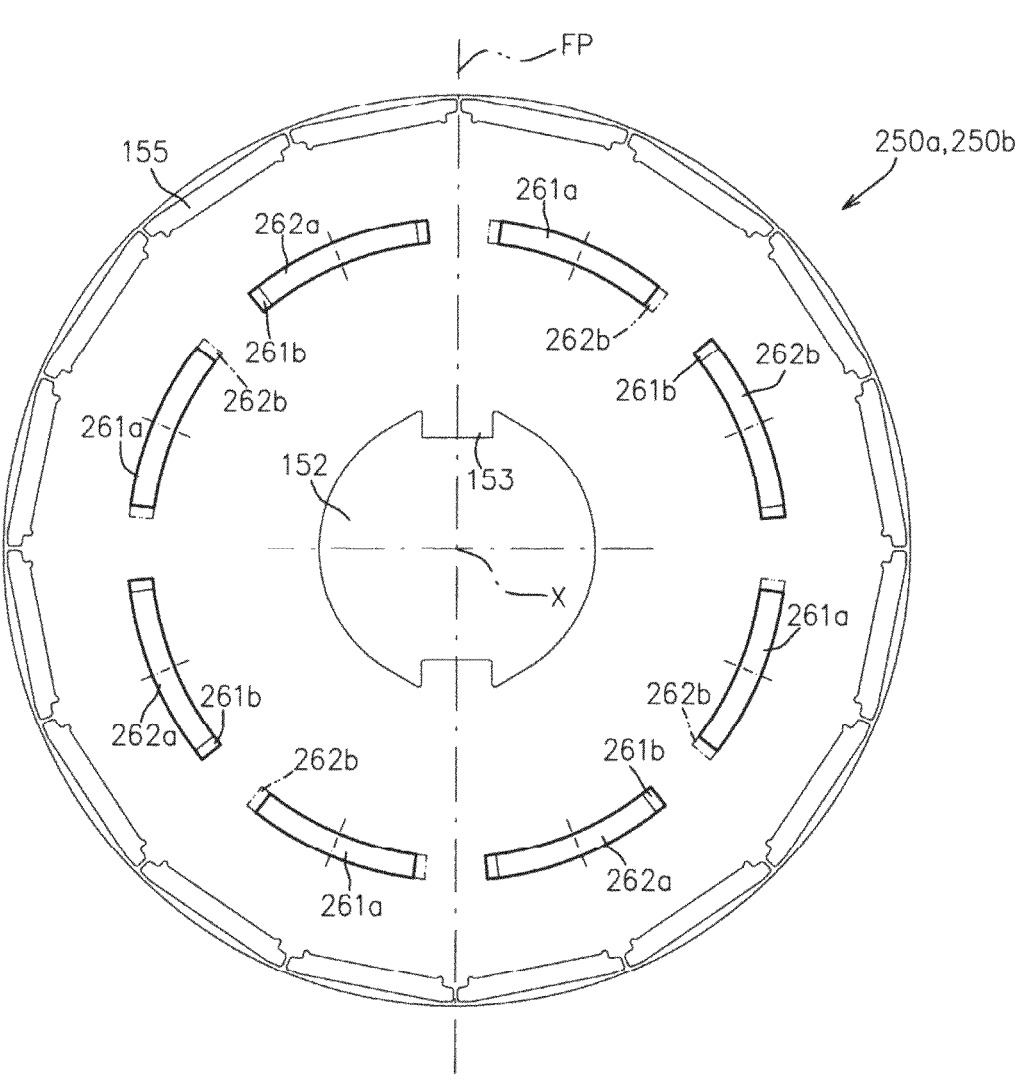
FIG. 22 is a plan view of the state where the first magnetic flat plate and the second magnetic flat plate according to the second embodiment are overlapped with each other, the first surface of the first magnetic flat plate faces one side in the rotation axis direction, and the second surface of the second magnetic flat plate faces one side in the rotation axis direction.

FIG. 22 is a plan view in which the first magnetic flat plate 250a having the first surface facing one side in the rotation axis direction and the second magnetic flat plate 250b having the second surface facing one side in the rotation axis direction are overlapped with each other with the aligned virtual center planes FP.

As illustrated in FIG. 22, when the first magnetic flat plate 250a in a first posture (front) having the first surface facing one side in the rotation axis direction and the second magnetic flat plate 250b in a second posture (back) having the second surface facing one side in the rotation axis direction are overlapped with each other with the aligned virtual center planes FP, the first opening 261a of the first magnetic flat plate 250a and the second opening 262b of the second magnetic flat plate 250b are overlapped with each other such that the radial positions of the circumferentially extending edge on the inner side in the radial direction and the circumferentially extending edge on the outer side in the radial direction are aligned with each other and the circumferential center positions are aligned with each other, and the second opening 262a of the first magnetic flat plate 250a and the first opening 261b of the second magnetic flat plate 250b are overlapped with each other such that the radial positions of the circumferentially extending edge on the inner side in the radial direction and the circumferentially extending edge on the outer side in the radial direction are aligned with each other and the circumferential positions are aligned with each other.

As illustrated in FIG. 21A and FIG. 21B, according to the present embodiment, the first openings 261 and the second openings 261 are alternately arranged along the circumferential direction.

The first magnetic assembly 281 includes the assembly of a predetermined number of the magnetic flat plates 250 that are laminated and fixed in a state where the magnetic flat plates 250 face in the identical direction with regard to the plate thickness direction and the openings of the identical type are aligned with each other.

The second magnetic assembly 282 includes the assembly of any number of the magnetic flat plates 250 that are laminated and fixed in a state where the magnetic flat plates 250 face in the identical direction with regard to the plate thickness direction and the openings of the identical type are aligned with each other.

The third magnetic assembly 283 includes the assembly of the magnetic flat plates 250 that are the identical number to the first magnetic assembly 281 and that are laminated and fixed in a state where the magnetic flat plates 250 face in the identical direction with regard to the plate thickness direction and the openings of the identical type are aligned with each other.

The first magnetic assembly 281 to the third magnetic assembly 283 are laminated and fixed in this order from one side to the other side in the rotation axis direction in a state where, with regard to the plate thickness direction, the first surfaces of the magnetic flat plates 250 forming the first magnetic assembly 281 and the third magnetic assembly 283 face one side in the rotation axis direction and the second surfaces of the magnetic flat plates 250 forming the second magnetic assembly 282 face one side in the rotation axis direction and, with regard to the circumferential direction around the rotation axis, the virtual center planes FP of the first magnetic assembly 281 to the third magnetic assembly 283 are aligned with each other.

Accordingly, the rotor main body 210 formed by the first magnetic assembly 281 to the third magnetic assembly 283 includes the shaft hole 112 formed by the shaft-hole opening 152, the magnet attachment hole 115 formed by the magnet openings 155, and the hook hole 221 formed by the hook openings 261 and 262.

Specifically, according to the present embodiment, the through-hole formed by the first opening 261 of the first magnetic assembly 281, the second opening 262 of the second magnetic assembly 282, and the first opening 261 of the third magnetic assembly 283 serves as the hook hole 221.

Specifically, as illustrated in FIG. 19, the hook hole 221 includes a first end-face side region 222 that is formed by the first opening 261 in the first magnetic assembly 281 and extends from an outer end portion open to the first end face 210 (1) toward the second end face 210 (2) in the axial direction by the distance corresponding to the thickness of the first magnetic assembly 281, a second end-face side region 223 that is formed by the first opening 261 in the third magnetic assembly 283 and extends from an outer end portion open to the second end face 210 (2) toward the first end face 110 (1) in the axial direction by the distance corresponding to the thickness of the third magnetic assembly 283, and an intermediate region 224 that is formed by the second opening 262 in the second magnetic assembly 282 and communicates between the first end-face side region 222 and the second end-face side region 223.

In the hook hole 221 having this configuration, a first end-face side step extending to both sides in the circumferential direction is formed between the first end-face side region 222 and the intermediate region 224, and a second end-face side step extending to both sides in the circumferential direction is formed between the second end-face side region 223 and the intermediate region 224.

The first end-face side step serves as a first end-face side holder locking portion in which the hook portion 431 described below of the first end-face side holder 400 (1) is locked, and the second end-face side step serves as a second end-face side holder locking portion in which the hook portion 431 of the second end-face side holder 400 (2) is locked.

Furthermore, as illustrated in FIG. 18 and FIG. 19, in addition to the hook hole 221, the rotor main body 210 is provided with a through-hole 225 that is formed by the second opening 262 of the first magnetic assembly 281, the first opening 261 of the second magnetic assembly 282, and the second opening 262 of the third magnetic assembly 283. The through-hole 225 is not used as a hook hole.

Next, the first end-face side holder 400 (1) will be described. According to the present embodiment, too, the second end-face side holder 400 (2) has the same configuration as that of the first end-face side holder 400 (1). Therefore, the following description of the first end-face side holder 400 (1) also applies to the second end-face side holder 400 (2).

Figure 23:
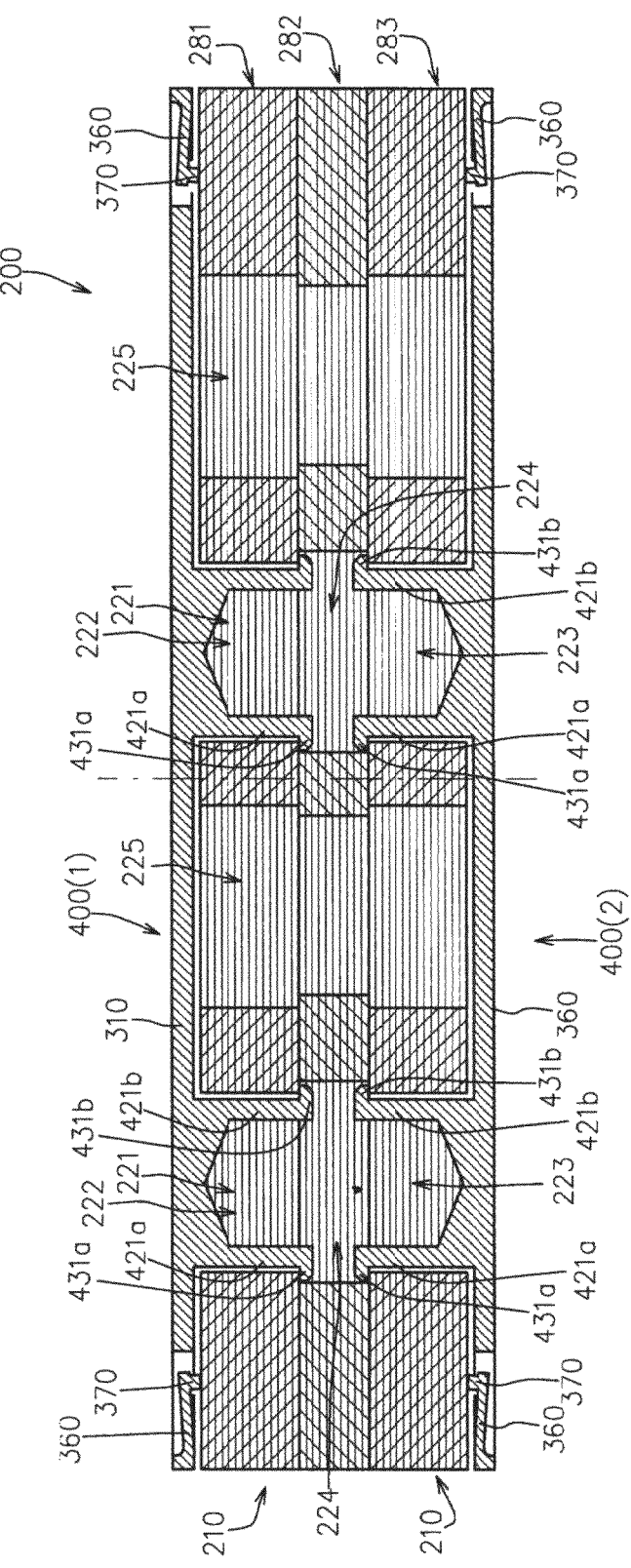
FIG. 23 is a vertical cross-sectional view of the rotor unit according to the second embodiment, illustrating the state taken along the same cross-section as in FIG. 19.

FIG. 23 is a vertical cross-sectional view of the rotor unit 200 taken along the same cross-section as in FIG. 19.

As illustrated in FIG. 20 and FIG. 23, the first end-face side holder 400 (1) is different from the first end-face side holder 300 (1) according to the first embodiment in that the insertion arms 321 and 325 and the hook portions 331 and 335 are changed to an insertion arm 421 and a hook portion 431.

Specifically, the first end-face side holder 400 (1) includes the holder main body 310, the elastically deformable insertion arm 421 extending from the holder main body 310, the hook portion 431 provided on a free end side of the insertion arm 421, the magnet pressing arm 340, the magnet pressing portion 350, the holder pressing arm 360, and the holder pressing portion 370.

The insertion arm 421 is insertable into the hook hole 221, and the hook portion 431 provided on the free end side of the insertion arm 421 is lockable in the first end-face side holder locking portion.

According to the present embodiment, as illustrated in FIG. 19, the first end-face side step between the first end-face side region 222 and the intermediate region 224 extends to both sides in the circumferential direction.

In this case, the insertion arm 421 includes first and second extension pieces 421a and 421b extending directly or indirectly from the holder main body 310 so as to be inserted along the edges on one side and the other side in the circumferential direction of the first end-face side region 222.

Further, the hook portion 431 includes first and second hook portions 431a and 431b projecting outward in the circumferential direction on the free end sides of the first extension piece 421a and the second extension piece 421b.

As described above in detail, all the three magnetic assemblies 181 to 183 are formed of only the magnetic flat plates 150 according to the first embodiment, and all the three magnetic assemblies 281 to 283 are formed of only the magnetic flat plates 250 according to the second embodiment.

The magnetic flat plates used in a rotor main body 610 according to a third embodiment described below includes two types of magnetic flat plates 650 and 660. As in the first and second embodiments, the rotor main body 610 is formed by joining three magnetic assemblies 681, 682, and 683 in the rotation axis direction, but the first magnetic assembly 681 and the third magnetic assembly 683 positioned on both sides are formed as laminated bodies of the magnetic flat plates 650, and the second magnetic assembly 682 at the center is formed as a laminated body of the magnetic flat plates 660.

Figure 24:
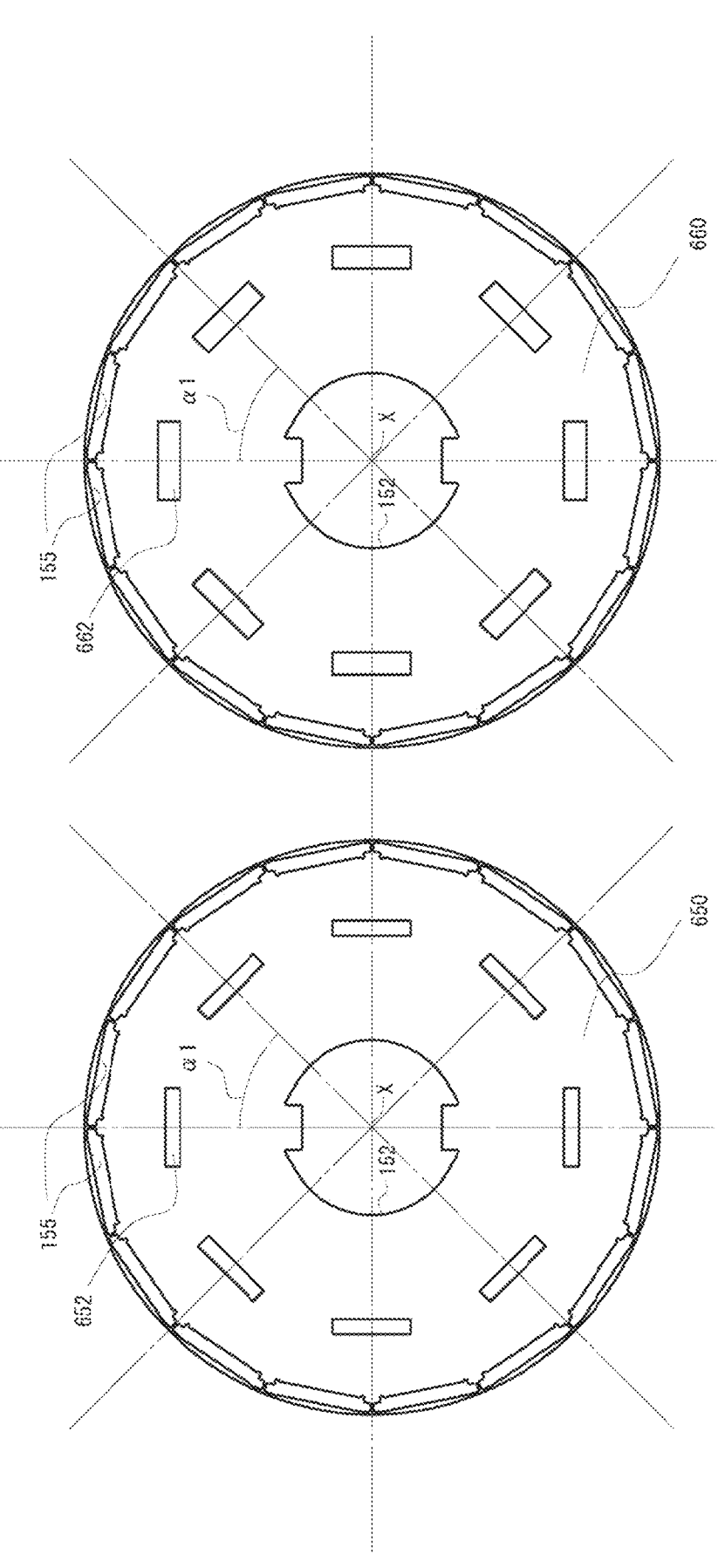
FIG. 24 is a plan view of two types of magnetic flat plates used in a third embodiment of the present invention.

FIG. 24 is a plan view of the magnetic flat plates 650 and 660. In both the magnetic flat plates 650 and 660, the shaft-hole opening 152 having the identical shape is formed in the center portion in the radial direction, and the identical number of magnet openings 155 having the identical shape are formed at equal intervals in the circumferential direction at the outermost edge in the radial direction. Hook openings 652 and 662 as hook holes 651 are formed at predetermined positions between the shaft-hole opening 152 and the magnet openings 155 in the radial direction. The identical number of hook openings 652 and 662 are arranged at intervals of an equal angle α1 along the circumferential direction, but in different shapes. This will be described below using FIG. 25.

Figure 26:
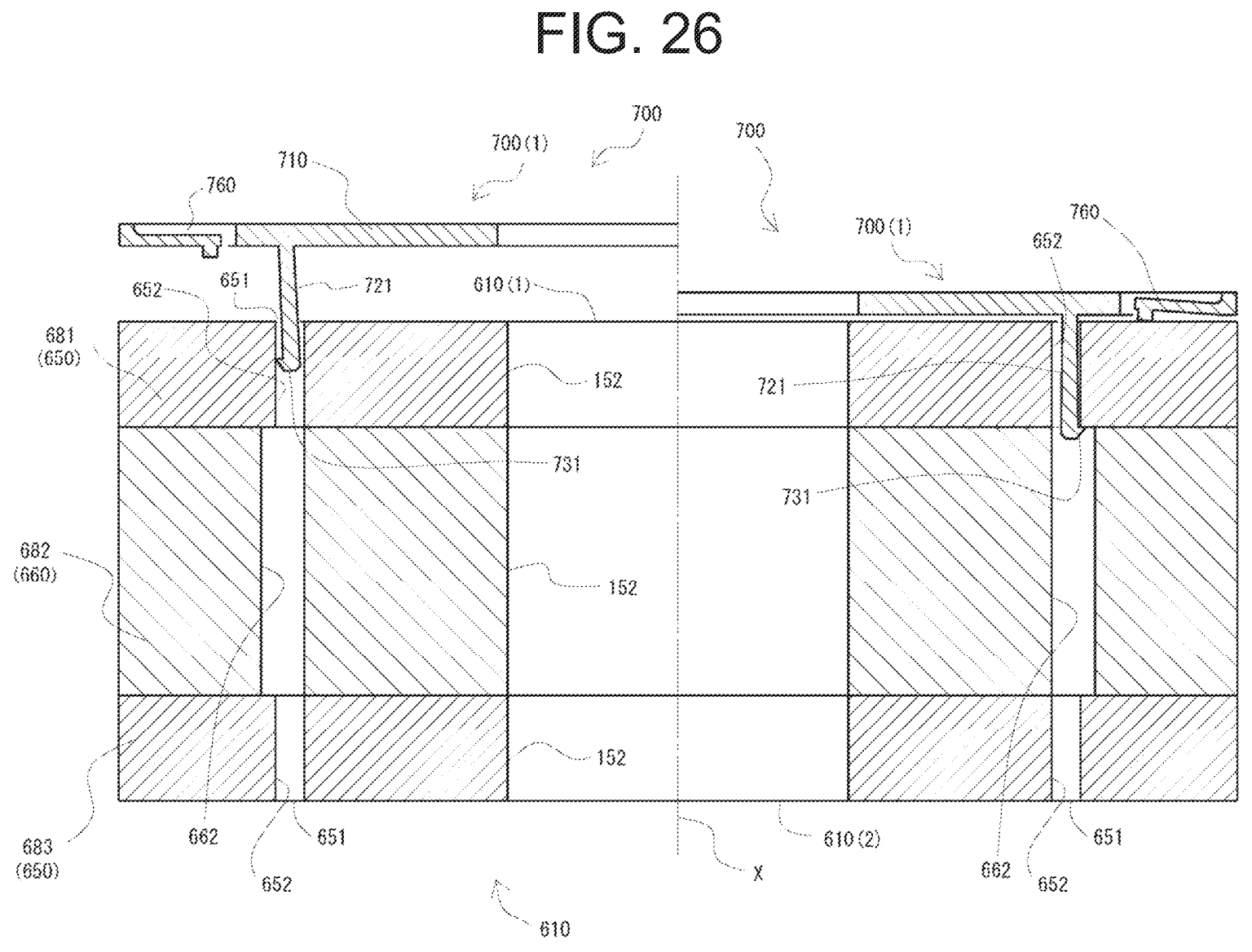

A resin magnet holder 700 according to the third embodiment, which is illustrated in cross-section in FIG. 26, includes a first end-face side holder 700 (1) and a second end-face side holder (not illustrated) as in the first and second embodiments. A holder main body 710 of the first end-face side holder 700 (1) includes a plurality of insertion arms 721 that extends in a direction substantially perpendicular to the plate surface direction and is tiltable by elastic deformation, and a hook portion 731 that protrudes in the radial direction on the free end side of the insertion arm 721. Further, holder pressing arms 760 and magnet pressing arms (not illustrated), which are elastically deformable, are alternately arranged in the circumferential direction on the outer edge portion of the holder main body 710.

Here, the protruding direction of the hook portion 731 according to the third embodiment is different from that in the first embodiment. The hook portions 331 and 335 according to the first embodiment alternately face outward and inward in the radial direction, and therefore the even number of insertion arms 321 and 325 are needed in total. On the other hand, as illustrated in FIG. 26, all the hook portions 731 according to the third embodiment face outward in the radial direction. When the orientation of the hook portion 731 is in one unified direction, it is possible to increase design flexibility, such as giving priority to the strength of itself, regardless of whether the number of insertion arms 721 is an even number or an odd number. This advantage may be obtained by using the two types of magnetic flat plates 650 and 660.

Figure 25:
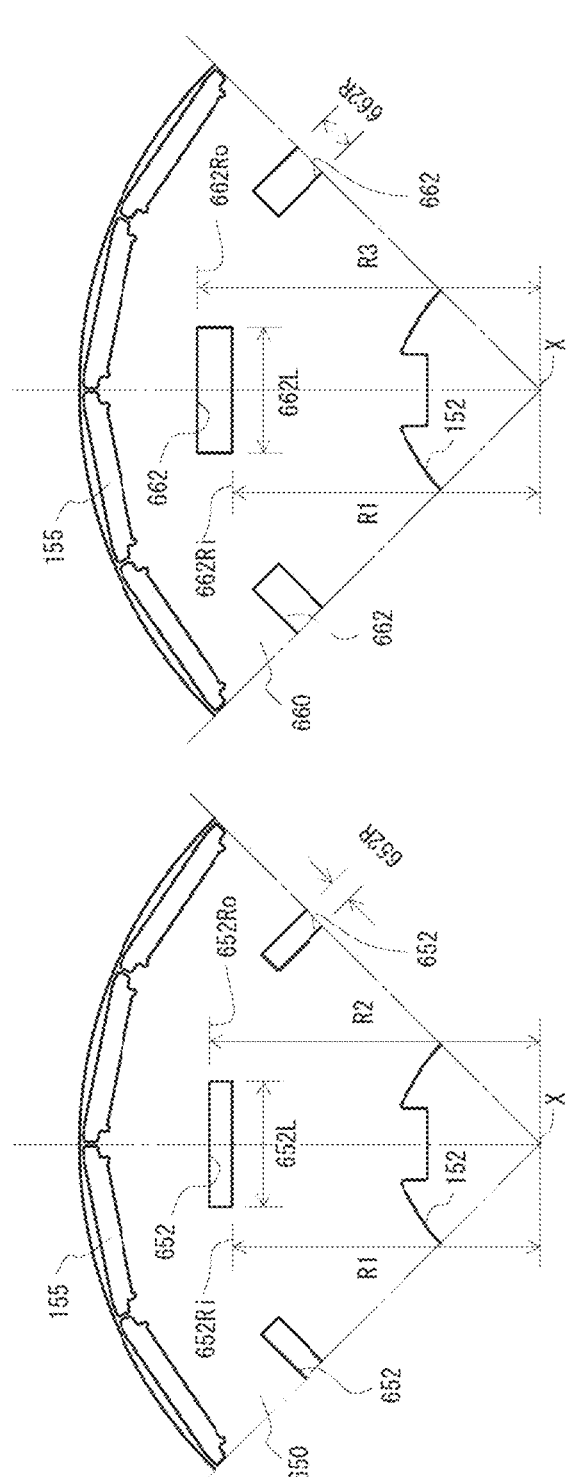
FIG. 25 is an enlarged plan view of a primary part of each of the magnetic flat plates, illustrated in FIG. 24, cut into ¼ in the circumferential direction.

FIG. 25 is an enlarged view of a primary part of the magnetic flat plates 650 and 660. The hook openings 652 and 662 formed in the magnetic flat plates 650 and 660 have identical circumferential lengths 652L and 662L and have the widths that allow the insertion arm 721 to be inserted. Radial distances 652R and 662R are different as described below.

When an inner end position 652Ri and an inner end position 662Ri included in inner end positions Di and outer end positions Do in the radial direction, which are start points of the radial distances 652R and 662R, are compared with each other, distances R1 from the rotation axis X are identical. When an outer end position 652Ro and an outer end position 662Ro are compared with each other, a distance R3 from the outer end position 662Ro to the rotation axis X is set to be larger than a distance R2 from the outer end position 652Ro to the rotation axis X.

The radial distance 652R, which is relatively narrow, is wide enough to allow the insertion of the hook portion 731 in a state where the insertion arm 721 is elastically deformed. The wide radial distance 662R is wide enough to allow the insertion of the hook portion 731 in a state where the insertion arm 721 is not elastically deformed.

As described above, before the second magnetic assembly 682 in which the magnetic flat plates 660 are laminated and fixed is sandwiched and fixed between the first magnetic assembly 681 and the third magnetic assembly 683 in which the magnetic flat plates 650 are laminated and fixed, the hook opening 652 of the magnetic flat plate 650 and the hook opening 662 of the magnetic flat plate 660 are aligned with each other in the circumferential direction to complete the rotor main body 610.

FIG. 26 is a vertical cross-sectional view passing through the hook hole 651 of the rotor main body 610. A step extending outward in the radial direction in an axially intermediate region of the rotor main body 610, i.e., a hook locking portion, is formed in the hook hole 651 at a joint boundary portion between the two adjacent magnetic assemblies 681 and 682 or 682 and 683.

The left half of the drawing with the rotation axis X as a boundary illustrates the state before the first end-face side holder 700 (1) in the rotor unit of FIG. 26 is fixed to the rotor main body 610. The right half of the drawing illustrates the state of being fixed to the rotor main body 610.

In the first end-face side holder 700 (1) before being fixed to the rotor main body 610, the hook portion 731 at the free end of the insertion arm 721 is positioned in the narrow hook opening 652 through the hook hole 651. The distal end of the hook portion 731 is in contact with the outer end face of the hook opening 652 so that the insertion arm 721 is elastically deformed inward in the radial direction. As the first end-face side holder 700 (1) is pushed toward a first end face 610 (1), the hook portion 731 moves toward the inside of the rotor main body 610 while sliding on the outer end face of the hook opening 652.

When the first end-face side holder 700 (1) reaches a predetermined installation position, the hook portion 731 is positioned in the wide hook opening 662. The hook portion 731 is no longer held, and the free end side of the insertion arm 721 is bent back outward in the radial direction so that the hook portion 731 is engaged with the hook portion locking portion. In this way, the first end-face side holder 700 (1) is fixed to the rotor main body 610. As in the first and second embodiments, the elastic deformation of the holder pressing arm 360 absorbs manufacturing errors caused by the length of the insertion arm 721 of the first end-face side holder 700 (1) and the thickness of the magnetic assembly 681 (the depth of the hook opening 662). As in the first and second embodiments, the magnet pressing arm (not illustrated) included in the first end-face side holder 700 (1) absorbs the backlash of the magnet (not illustrated).

A second end-face side holder (not illustrated) is similarly installed on a second end face 610 (2) of the rotor main body 610.

Furthermore, as the magnet holders 300, 400, and 700 made of a synthetic resin material are elastically fixed to the rotor main bodies 110 and 210, the magnet holders 300, 400, and 700 may be broken or crushed to be easily separated from the rotor main bodies 110 and 210 and the magnet 500 without being attached thereto, as compared with the case where the magnet holders 300, 400, and 700 are bonded and fixed, which may provide desirable recyclability such as collection of the magnets 500.

REFERENCE SIGNS LIST

10 Rotation shaft
100, 200, 600 Rotor unit
110, 210, 610 Rotor main body
110 (1), 210 (1), 610 (1) First end face
110 (2), 210 (2), 610 (2) Second end face
112 Shaft hole
113 Rotor main-body side engagement portion
115 Magnet attachment hole
121 First hook hole
125 Second hook hole
150, 250 Magnetic flat plate
152 Shaft-hole opening
153 Engagement-portion forming structure
155 Magnet opening
161, 261 First hook opening
162, 262 Second hook opening
181 to 183, 281 to 283, 681 to 683 First to third magnetic assemblies
300, 400, 700 Magnet holder
300 (1), 400 (1), 700 (1) First end-face side holder
300 (2), 400 (2) Second end-face side holder
310, 710 Holder main body
311 Central opening
312 Inner ring body
314 Outer ring body
316 Bridge
321 First insertion arm
325 Second insertion arm
331, 335 Hook portion
340 Magnet pressing arm
350 Magnet pressing portion
360, 760 Holder pressing arm
370 Holder pressing portion
385 First arm
390 Support frame
392 Radially extending arm
394 Coupling arm
395 Second arm
421 Insertion arm
421a, 421b First and second extension pieces
431a, 431b First and second hook portions
500 Magnet
650, 660 Magnetic flat plate
651 Hook hole
652, 662 Hook opening
652R, 662R Radial distance
652L, 662L Circumferential length
X Rotation axis
FP Virtual center plane

The invention claimed is:
1. A rotor unit for electric motor comprising:
a rotor main body having a plurality of magnetic flat plates laminated therein;
a magnet attached to the rotor main body; and
a first end-face side holder attached to a first end face of the rotor main body on one side in a rotation axis direction, wherein
the rotor main body includes

28 a shaft hole that is open to at least the first end face on a rotation axis and has a rotation shaft inserted thereinto,
a magnet attachment hole that is open to at least the first end face at a position away from the shaft hole outward in a radial direction and has the magnet attached thereto, and
a hook hole that is open to at least the first end face at a position different from the shaft hole and the magnet attachment hole in the radial direction,
the first end-face side holder includes
a plate like holder main body including a central opening,
an elastically deformable insertion arm extending from the holder main body so as to be inserted into the hook hole in an installation posture of the holder main body in which, in a planar view, the central opening is overlapped with the shaft hole and the holder main body is opposed to the first end face of the rotor main body,
a hook portion provided on a free end side of the insertion arm,
a magnet pressing arm that extends from the holder main body and is elastically deformable in a direction perpendicular to a plate surface of the holder main body, and
a magnet pressing portion provided on a free end side of the magnet pressing arm so as to be in contact with a first end face of the magnet on the one side in the rotation axis direction attached to the magnet attachment hole in the installation posture of the holder main body,
the hook hole is provided with a first end-face side locking portion in which the hook portion is lockable,
when the hook portion is locked in the first end-face side locking portion, the magnet pressing portion is pressed against the first end face of the magnet due to inherent elasticity of the magnet pressing arm accompanying elastic deformation,
the first end-face side holder includes
a holder pressing arm that extends from the holder main body and is elastically deformable in a direction perpendicular to the plate surface of the holder main body, and
a holder pressing portion provided on a free end side of the holder pressing arm so as to be in contact with the first end face of the rotor main body in the installation posture of the holder main body, and
when the hook portion of the first end-face side holder is locked in the first end-face side locking portion, the holder pressing portion is pressed against the first end face of the rotor main body due to inherent elasticity of the holder pressing arm accompanying elastic deformation.
2. The rotor unit according to claim 1, wherein
the magnet pressing arm extends from the holder main body so as to be positioned on one of an outer side and an inner side in the radial direction with respect to the rotation axis as the magnet pressing arm extends from a base end side to a free end side, and
the holder pressing arm extends from the holder main body so as to be positioned on other one of the outer side and the inner side in the radial direction with respect to the rotation axis as the holder pressing arm extends from a base end side to a free end side.
3. The rotor unit according to claim 1, wherein
the holder main body includes

29 an inner ring body defining the central opening, an outer ring body surrounding the inner ring body, and a plurality of bridges coupling the inner ring body and the outer ring body, the bridges are arranged with gaps in a circumferential direction around the rotation axis, the magnet pressing arm and the holder pressing arm are arranged in the gaps alternately in the circumferential direction, the magnet pressing arm extends in the radial direction from one of the inner ring body and the outer ring body, and the holder pressing arm extends in the radial direction from other one of the inner ring body and the outer ring body.

4. The rotor unit according to claim 1, wherein the holder main body includes a ring body defining the central opening, a first arm extending from the ring body in the radial direction, and a support frame extending from the ring body in the radial direction, the first arm and the support frame are arranged alternately in the circumferential direction around the rotation axis, the support frame includes a pair of radially extending arms extending to one side in the radial direction while being separated from each other in the circumferential direction with a gap therebetween, a coupling arm coupling free end sides of the pair of radially extending arms, and a second arm extending from the coupling arm to other side in the radial direction in the gap, and one of the first arm and the second arm forms the magnet pressing arm, and other one of the first arm and the second arm forms the holder pressing arm.

5. The rotor unit according to claim 1, further comprising a second end-face side holder attached to a second end face of the rotor main body on other side in the rotation axis direction, wherein the magnet attachment hole and the hook hole are through-holes that are also open to the second end face, the second end-face side holder has a configuration identical to the first end-face side holder, the hook hole is provided with a second end-face side locking portion in which a hook portion of the second end-face side holder is lockable, and when the hook portion of the second end-face side holder is locked in the second end-face side locking portion, the magnet pressing portion is pressed against a second end face of the magnet due to inherent elasticity of the magnet pressing arm accompanying elastic deformation, and the holder pressing portion is pressed against the second end face of the rotor main body due to inherent elasticity of the holder pressing arm accompanying elastic deformation.

6. The rotor unit according to claim 5, wherein the rotor main body is provided with a plurality of the hook holes arranged in a circumferential direction around the rotation axis, the magnetic flat plate includes a shaft-hole opening forming the shaft hole, a magnet opening forming the magnet attachment hole, and

30 a plurality of hook openings arranged along the circumferential direction around the rotation axis to form the plurality of the hook holes, the plurality of hook openings includes a first opening having a radial distance A1 between a circumferentially extending edge on an inner side in the radial direction and the rotation axis and a radial distance A2 between a circumferentially extending edge on an outer side in the radial direction and the rotation axis, and a second opening having a radial distance B1 between a circumferentially extending edge on the inner side in the radial direction and the rotation axis and a radial distance B2 between a circumferentially extending edge on the outer side in the radial direction and the rotation axis (where A1<B1<A2<B2), the first opening and the second opening are arranged symmetrically to each other in the circumferential direction with respect to a virtual center plane that passes through the rotation axis and is perpendicular to a plane of the magnetic flat plate, the plurality of magnetic flat plates forms first to third magnetic assemblies formed by laminating and fixing the magnetic flat plates in a state where the magnetic flat plates face in an identical direction with regard to a plate thickness direction and openings of an identical type are aligned with each other, the first magnetic assembly and the third magnetic assembly include an identical number of the magnetic flat plates so as to have an identical axial thickness, the rotor main body includes the first to third magnetic assemblies that are laminated and fixed in this order from the one side to the other side in the rotation axis direction, the first to third magnetic assemblies are laminated and fixed in a state where, with regard to the plate thickness direction, first surfaces on one side in the plate thickness direction of the magnetic flat plates forming the first magnetic assembly and the third magnetic assembly face to the one side in the rotation axis direction, second surfaces on other side in the plate thickness direction of the magnetic flat plates forming the second magnetic assembly face to the one side in the rotation axis direction, and, with regard to the circumferential direction around the rotation axis, virtual center planes of the first to third magnetic assemblies are aligned with each other, and a radial step between the hook opening of the first magnetic assembly and the hook opening of the second magnetic assembly forms the first end-face side locking portion, and a radial step between the hook opening of the third magnetic assembly and the hook opening of the second magnetic assembly forms the second end-face side locking portion.

7. The rotor unit according to claim 6, wherein the first opening and the second opening are alternately arranged in the circumferential direction.

8. The rotor unit according to claim 6, wherein the shaft hole is provided with a rotor main-body side engagement portion that engages with a rotation-shaft side engagement portion integrally or separately provided in the rotation shaft in a recessed-protruding manner in order to couple the rotation shaft and the rotor main body so as to disable a relative rotation around the rotation axis, the shaft-hole opening of the magnetic flat plate is provided with an engagement-portion forming structure that forms the rotor main-body side engagement portion, and the engagement-portion forming structure has a symmetrical shape with respect to the virtual center plane.

9. The rotor unit according to claim 5, wherein the rotor main body is provided with a plurality of the hook holes arranged in the circumferential direction around the rotation axis, the magnetic flat plate includes a shaft-hole opening forming the shaft hole, a magnet opening forming the magnet attachment hole, and a plurality of hook openings arranged along the circumstantial direction around the rotation axis to form the plurality of the hook holes, the plurality of hook openings includes a first opening having a circumferential length L1, and a second opening having a circumferential length L2 (where L2>L1), the first opening and the second opening are arranged symmetrically to each other in the radial direction with respect to a virtual center plane that passes through the rotation axis and is perpendicular to a plane of the magnetic flat plate, the plurality of magnetic flat plates forms first to third magnetic assemblies formed by laminating and fixing the magnetic flat plates in a state where the magnetic flat plates face in an identical direction with regard to a plate thickness direction and openings of an identical type are aligned with each other, the first magnetic assembly and the third magnetic assembly include an identical number of the magnetic flat plates so as to have an identical axial thickness, the rotor main body includes the first to third magnetic assemblies that are laminated and fixed in this order from the one side to the other side in the rotation axis direction, the first to third magnetic assemblies are laminated and fixed in a state where, with regard to the plate thickness direction, first surfaces on the one side in the plate thickness direction of the magnetic flat plates forming the first magnetic assembly and the third magnetic assembly face to the one side in the rotation axis direction, second surfaces on the other side in the plate thickness direction of the magnetic flat plates forming the second magnetic assembly face to the one side in the rotation axis direction and, with regard to the circumferential direction around the rotation axis, the virtual center planes of the first to third magnetic assemblies are aligned with each other, a circumferential step between the hook opening of the first magnetic assembly and the hook opening of the second magnetic assembly forms the first end-face side locking portion, and a circumferential step between the hook opening of the third magnetic assembly and the hook opening of the second magnetic assembly forms the second end-face side locking portion.

10. The rotor unit according to claim 9, wherein the first opening and the second opening are formed such that the circumferential step between the hook opening of the first magnetic assembly and the hook opening of the second magnetic assembly includes a first step and a second step that extend to one side and other side in the circumferential direction, respectively, and the circumferential step between the hook opening of the third magnetic assembly and the hook opening of the second magnetic assembly includes a first step and a second step that extend to the one side and the other side in the circumferential direction, respectively, the insertion arms of the first end-face side holder and the second end-face side holder include a first extension piece and a second extension piece that extend from the holder main body so as to be inserted along edges of the first opening on the one side and the other side in the circumferential direction, the hook portion includes a first hook portion and a second hook portion that protrude outward in the circumferential direction on free end sides of the first extension piece and the second extension piece, respectively, and the first hook portion and the second hook portion are lockable in the first step and the second step, respectively.

11. The rotor unit according to claim 9, wherein the shaft hole is provided with a rotor main-body side engagement portion that engages with a rotation-shaft side engagement portion integrally or separately provided in the rotation shaft in a recessed-protruding manner in order to couple the rotation shaft and the rotor main body so as to disable a relative rotation around the rotation axis, the shaft-hole opening of the magnetic flat plate is provided with an engagement-portion forming structure that forms the rotor main-body side engagement portion, and the engagement-portion forming structure has a symmetrical shape with respect to the virtual center plane.

12. A rotor main body for electric motor comprising:

a shaft hole that has a rotation shaft inserted thereinto;

a magnet attachment hole provided at a position away from the shaft hole outward in a radial direction;

a plurality of hook holes provided along a circumferential direction at positions different from the shaft hole and the magnet attachment hole in the radial direction; and a plurality of magnetic flat plates, wherein the magnetic flat plate includes a shaft-hole opening forming the shaft hole, a magnet opening forming the magnet attachment hole, and a plurality of hook openings arranged along the circumferential direction around the rotation axis to form the plurality of hook holes, the plurality of hook openings includes a first opening having a radial distance A1 between a circumferentially extending edge on an inner side in the radial direction and the rotation axis and a radial distance A2 between a circumferentially extending edge on an outer side in the radial direction and the rotation axis, and a second opening having a radial distance B1 between a circumferentially extending edge on the inner side in the radial direction and the rotation axis and a radial distance B2 between a circumferentially extending edge on the outer side in the radial direction and the rotation axis (where A1<B1<A2<B2), the first opening and the second opening are arranged symmetrically to each other in the circumferential direction with respect to a virtual center plane that passes through the rotation axis and is perpendicular to a plane of the magnetic flat plate, the plurality of magnetic flat plates forms a first magnetic assembly and a second magnetic assembly formed by laminating and fixing the magnetic flat plates in a state where the magnetic flat plates face in an identical direction with regard to a plate thickness direction and openings of an identical type are aligned with each other, the first magnetic assembly and the second magnetic assembly are laminated and fixed in this order from one side to other side in the rotation axis direction in a state where, with regard to the plate thickness direction, first surfaces on one side in the plate thickness direction of the magnetic flat plates forming the first magnetic assembly face to the one side in the rotation axis direction, second surfaces on other side in the plate thickness direction of the magnetic flat plates forming the second magnetic assembly face to the one side in the rotation axis direction and, with regard to the circumferential direction around the rotation axis, the virtual center planes of the first magnetic assembly and the second magnetic assembly are aligned with each other, and a radial step is provided between the hook opening of the first magnetic assembly and the hook opening of the second magnetic assembly.

13. The rotor main body according to claim 12, further comprising a third magnetic assembly formed by laminating and fixing a plurality of magnetic flat plates having an identical configuration to that of the magnetic flat plates in a state where the plurality of magnetic flat plates faces in an identical direction with regard to the plate thickness direction and openings of an identical type are aligned with each other, wherein the third magnetic assembly is fixed to other side of the second magnetic assembly in the rotation axis direction in a state where first surfaces of the magnetic flat plates forming the third magnetic assembly face to the one side in the rotation axis direction and the virtual center planes are aligned with each other, and a radial step is provided between a hook opening of the third magnetic assembly and the hook opening of the second magnetic assembly.

14. A rotor main body for electric motor comprising:
a shaft hole that has a rotation shaft inserted thereinto;
a magnet attachment hole provided at a position away from the shaft hole outward in a radial direction;
a plurality of hook holes provided along a circumferential direction at positions different from the shaft hole and the magnet attachment hole in the radial direction; and
a plurality of magnetic flat plates, wherein
the magnetic flat plate includes
a shaft-hole opening forming the shaft hole,
a magnet opening forming the magnet attachment hole, and
a plurality of hook openings arranged along the circumferential direction around the rotation axis to form the plurality of hook holes, the plurality of hook openings includes
a first opening having a circumferential length L1, and
a second opening having a circumferential length L2 (where L2>L1), the first opening and the second opening are arranged symmetrically to each other in the radial direction with respect to a virtual center plane that passes through the rotation axis and is perpendicular to a plane of the magnetic flat plate, the plurality of magnetic flat plates forms a first magnetic assembly and a second magnetic assembly formed by laminating and fixing the magnetic flat plates in a state where the magnetic flat plates face in an identical direction with regard to a plate thickness direction and openings of an identical type are aligned with each other, the first magnetic assembly and the second magnetic assembly are laminated and fixed in this order from one side to other side in the rotation axis direction in a state where, with regard to the plate thickness direction, first surfaces on one side in the plate thickness direction of the magnetic flat plates forming the first magnetic assembly face to the one side in the rotation axis direction, second surfaces on other side in the plate thickness direction of the magnetic flat plates forming the second magnetic assembly face to the one side in the rotation axis direction and, with regard to the circumferential direction around the rotation axis, the virtual center planes of the first magnetic assembly and the second magnetic assembly are aligned with each other, and a circumferential step is provided between the hook opening of the first magnetic assembly and the hook opening of the second magnetic assembly.

15. The rotor main body according to claim 14, further comprising a third magnetic assembly formed by laminating and fixing a plurality of magnetic flat plates having an identical configuration to that of the magnetic flat plates in a state where the plurality of magnetic flat plates faces in an identical direction with regard to the plate thickness direction and openings of an identical type are aligned with each other, wherein the third magnetic assembly is fixed to other side of the second magnetic assembly in the rotation axis direction in a state where first surfaces of the magnetic flat plates forming the third magnetic assembly face to the one side in the rotation axis direction and the virtual center planes are aligned with each other, and a circumferential step is provided between a hook opening of the third magnetic assembly and the hook opening of the second magnetic assembly.

* * * * *